(12) United States Patent
Usoro et al.

(10) Patent No.: US 6,743,147 B2
(45) Date of Patent: Jun. 1, 2004

(54) FAMILY OF MULTI-SPEED PLANETARY TRANSMISSIONS HAVING A CLUTCHED INPUT AND ONE STATIONARY MEMBER

(75) Inventors: Patrick Benedict Usoro, Troy, MI (US); Chunhao J. Lee, Troy, MI (US); Norman Kenneth Bucknor, Troy, MI (US); Chi-Kuan Kao, Troy, MI (US); Madhusudan Raghavan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/284,071

(22) Filed: Oct. 30, 2002

(65) Prior Publication Data

US 2004/0087410 A1 May 6, 2004

(51) Int. Cl.$^7$ .............................. F16H 3/44; F16H 37/06
(52) U.S. Cl. ..................... 475/296; 475/330; 475/275
(58) Field of Search ................. 475/296, 271, 475/275–280, 282, 284, 286, 288, 290, 293, 311, 313, 317, 319, 323, 325, 330

(56) References Cited

U.S. PATENT DOCUMENTS

| | | | | |
|---|---|---|---|---|
| 4,070,927 A | | 1/1978 | Polak | 74/765 |
| 4,660,439 A | * | 4/1987 | Hiraiwa | 475/276 |
| 4,709,594 A | | 12/1987 | Maeda | 74/753 |
| 5,098,357 A | * | 3/1992 | Asada et al. | 475/278 |
| 5,106,352 A | | 4/1992 | Lepelletier | 475/280 |
| 5,599,251 A | | 2/1997 | Beim et al. | 475/275 |
| 6,053,839 A | | 4/2000 | Baldwin et al. | 475/281 |
| 6,071,208 A | | 6/2000 | Koivunen | 475/275 |
| 6,083,135 A | | 7/2000 | Baldwin et al. | 475/276 |
| 6,217,474 B1 | | 4/2001 | Ross et al. | 475/269 |
| 6,589,129 B2 | * | 7/2003 | Usoro et al. | 475/275 |
| 6,620,075 B2 | * | 9/2003 | Kao et al. | 475/275 |

FOREIGN PATENT DOCUMENTS

JP  9-126283  5/1997

* cited by examiner

Primary Examiner—Tisha D Lewis
(74) Attorney, Agent, or Firm—Kathryn A. Marra

(57) ABSTRACT

A family of transmissions having a plurality of family members each having three planetary gearsets and six torque-transmitting mechanisms. The planetary gearsets and the torque-transmitting mechanisms are interconnected such that at least seven forward speed ratios and one reverse speed ratio can be established within the three planetary gearsets and transmitted between an input shaft and an output shaft, by selectively engaging the torque transmitting mechanisms in combinations of four.

5 Claims, 18 Drawing Sheets

|  | Ratios | 50 | 52 | 54 | 56 | 58 | 60 |
|---|---|---|---|---|---|---|---|
| Reverse | -7.52 |  | X | X | X |  | X |
| Neutral | 0.00 |  | X |  | X |  | X |
| 1 | 4.98 |  | X |  | X | X | X |
| 2 | 3.12 |  | X | X | X | X |  |
| 3 | 1.74 | X | X |  | X | X |  |
| 4 | 1.00 | X |  | X | X | X |  |
| 5 | 0.78 | X | X | X |  | X |  |
| 6 | 0.71 | X |  | X |  | X | X |
| 7 | 0.62 | X | X |  |  | X | X |

(X = engaged)

Ring Gear/Sun Gear Tooth Ratios: $\frac{R1}{S1}=2.41, \frac{R2}{S2}=1.51, \frac{R3}{S3}=2.12$

| Ratio Spread | 8.05 |
|---|---|
| Ratio Steps |  |
| Rev/1 | -1.51 |
| 1/2 | 1.60 |
| 2/3 | 1.79 |
| 3/4 | 1.74 |
| 4/5 | 1.28 |
| 5/6 | 1.10 |
| 6/7 | 1.14 |

| | Ratios | 150 | 152 | 154 | 156 | 158 | 160 |
|---|---|---|---|---|---|---|---|
| Reverse | -5.48 | | X | | X | X | X |
| Neutral | 0.00 | | X | | X | | X |
| 1 | 5.86 | | X | X | X | | X |
| 2 | 2.91 | | X | X | X | X | |
| 3 | 1.75 | X | | X | X | X | |
| 4 | 1.45 | X | X | | | X | X |
| 5 | 1.00 | X | X | X | | X | |
| 6 | 0.75 | X | X | X | | | X |
| 7 | 0.68 | X | X | | | X | X |
| 8 | 0.61 | X | | X | | X | X |

(X = engaged)

Ring Gear/Sun Gear Tooth Ratios: $\frac{R1}{S1}=1.54, \frac{R2}{S2}=2.56, \frac{R3}{S3}=1.52$

| Ratio Spread | 9.67 |
|---|---|
| Ratio Steps | |
| Rev/1 | -0.94 |
| 1/2 | 2.02 |
| 2/3 | 1.66 |
| 3/4 | 1.21 |
| 4/5 | 1.45 |
| 5/6 | 1.33 |
| 6/7 | 1.11 |
| 7/8 | 1.12 |

| | Ratios | 250 | 252 | 254 | 256 | 258 | 260 |
|---|---|---|---|---|---|---|---|
| Reverse | -1.96 | X | | | X | X | X |
| Neutral | 0.00 | X | | | | X | X |
| 1 | 2.97 | X | | X | | X | X |
| 2 | 1.68 | X | | X | X | X | |
| 3 | 1.00 | | X | X | X | X | |
| 4 | 0.74 | X | X | | X | X | |
| 5 | 0.62 | X | X | X | X | | |
| 6 | 0.50 | X | X | | X | | X |
| 7 | 0.40 | | X | X | X | | X |

(X = engaged)

Ring Gear/Sun Gear Tooth Ratios: $\frac{R1}{S1}=1.97, \frac{R2}{S2}=1.52, \frac{R3}{S3}=1.89$

| Ratio Spread | 7.46 |
|---|---|
| Ratio Steps | |
| Rev/1 | -0.66 |
| 1/2 | 1.76 |
| 2/3 | 1.68 |
| 3/4 | 1.35 |
| 4/5 | 1.20 |
| 5/6 | 1.24 |
| 6/7 | 1.25 |

|  | Ratios | 350 | 352 | 354 | 356 | 358 | 360 |
|---|---|---|---|---|---|---|---|
| Reverse | -3.20 | X |  | X |  | X | X |
| Neutral | 0.00 | X |  |  |  | X | X |
| 1 | 4.50 | X |  |  | X | X | X |
| 2 | 2.13 | X |  | X | X | X |  |
| 3 | 1.58 | X | X |  | X | X |  |
| 4 | 1.28 | X | X | X |  | X |  |
| 5 | 1.00 | X | X | X | X |  |  |
| 6 | 0.75 |  | X | X | X |  | X |
| 7 | 0.64 | X | X | X |  |  | X |

*(X = engaged)*

Ring Gear/Sun Gear Tooth Ratios: $\frac{R1}{S1} = 1.50, \frac{R2}{S2} = 2.99, \frac{R3}{S3} = 1.52$

| Ratio Spread | 7.00 |
|---|---|
| Ratio Steps |  |
| Rev/1 | -0.71 |
| 1/2 | 2.11 |
| 2/3 | 1.35 |
| 3/4 | 1.23 |
| 4/5 | 1.28 |
| 5/6 | 1.33 |
| 6/7 | 1.17 |

| | Ratios | 450 | 452 | 454 | 456 | 458 | 460 |
|---|---|---|---|---|---|---|---|
| Reverse | -2.99 | X | | X | | X | X |
| Neutral | 0.00 | X | | | | X | X |
| 1 | 4.50 | X | | | X | X | X |
| 2 | 2.13 | X | | X | X | X | |
| 3 | 1.58 | X | X | | X | X | |
| 4 | 1.28 | | X | X | X | X | |
| 5 | 1.00 | X | X | X | X | | |
| 6 | 0.75 | | X | X | X | | X |
| 7 | 0.64 | X | X | | X | | X |

(X = engaged)

Ring Gear/Sun Gear Tooth Ratios: $\frac{R1}{S1} = 1.50, \frac{R2}{S2} = 2.99, \frac{R3}{S3} = 1.52$

| Ratio Spread | 7.00 |
|---|---|
| Ratio Steps | |
| Rev/1 | -0.71 |
| 1/2 | 2.11 |
| 2/3 | 1.35 |
| 3/4 | 1.23 |
| 4/5 | 1.28 |
| 5/6 | 1.33 |
| 6/7 | 1.17 |

| | Ratios | 550 | 552 | 554 | 556 | 558 | 560 |
|---|---|---|---|---|---|---|---|
| Reverse | -4.96 | | X | X | X | | X |
| Neutral | 0.00 | | X | | X | | X |
| 1 | 3.29 | | X | | X | X | X |
| 2 | 1.66 | | X | X | X | X | |
| 3 | 1.25 | X | X | | X | X | |
| 4 | 1.00 | X | | X | X | X | |
| 5 | 0.88 | X | X | X | | X | |
| 6 | 0.75 | X | | X | | X | X |
| 7 | 0.61 | X | | X | | X | X |

(X = engaged)

Ring Gear/Sun Gear Tooth Ratios: $\frac{R1}{S1} = 2.99, \frac{R2}{S2} = 1.51, \frac{R3}{S3} = 1.52$

| Ratio Spread | 5.39 |
|---|---|
| Ratio Steps | |
| Rev/1 | -1.51 |
| 1/2 | 1.98 |
| 2/3 | 1.33 |
| 3/4 | 1.25 |
| 4/5 | 1.13 |
| 5/6 | 1.18 |
| 6/7 | 1.23 |

| | Ratios | 650 | 652 | 654 | 656 | 658 | 660 |
|---|---|---|---|---|---|---|---|
| Reverse | -3.35 | | X | X | X | | X |
| Neutral | 0.00 | | | X | X | | X |
| 1 | 3.88 | X | | X | X | | X |
| 2 | 1.66 | X | | X | | X | X |
| 3 | 1.26 | X | | X | X | X | |
| 4 | 1.00 | X | | | X | X | X |
| 5 | 0.83 | X | X | | X | | X |
| 6 | 0.79 | X | X | | | X | X |
| 7 | 0.60 | X | X | | X | X | |

(X = engaged)

Ring Gear/Sun Gear Tooth Ratios: $\frac{R1}{S1} = 1.51, \frac{R2}{S2} = 1.97, \frac{R3}{S3} = 1.52$

| Ratio Spread | 6.44 |
|---|---|
| Ratio Steps | |
| Rev/1 | -0.86 |
| 1/2 | 2.33 |
| 2/3 | 1.32 |
| 3/4 | 1.26 |
| 4/5 | 1.20 |
| 5/6 | 1.05 |
| 6/7 | 1.31 |

| | Ratios | 750 | 752 | 754 | 756 | 758 | 760 |
|---|---|---|---|---|---|---|---|
| Reverse | -4.44 | X | | X | X | | X |
| Neutral | 0.00 | | | | X | | X |
| 1 | 3.95 | | X | | X | X | X |
| 2 | 2.75 | | X | X | X | X | |
| 3 | 1.88 | X | X | | X | X | |
| 4 | 1.51 | X | | X | X | X | |
| 5 | 1.00 | X | X | X | | X | |
| 6 | 0.76 | X | X | | | X | X |
| 7 | 0.71 | X | | X | | X | X |

(X = engaged)

Ring Gear/Sun Gear Tooth Ratios: $\frac{R1}{S1} = 2.41, \frac{R2}{S2} = 1.51, \frac{R3}{S3} = 2.95$

| Ratio Spread | 5.59 |
|---|---|
| Ratio Steps | |
| Rev/1 | -1.12 |
| 1/2 | 1.44 |
| 2/3 | 1.46 |
| 3/4 | 1.24 |
| 4/5 | 1.51 |
| 5/6 | 1.31 |
| 6/7 | 1.08 |

|  | Ratios | 850 | 852 | 854 | 856 | 858 | 860 |
|---|---|---|---|---|---|---|---|
| Reverse | -2.99 | X |  | X |  | X | X |
| Neutral | 0.00 | X |  |  |  | X | X |
| 1 | 4.50 | X |  |  | X | X | X |
| 2 | 2.13 | X |  | X | X | X |  |
| 3 | 1.58 | X | X |  | X | X |  |
| 4 | 1.28 |  | X | X | X | X |  |
| 5 | 1.00 | X | X | X | X |  |  |
| 6 | 0.75 |  | X | X | X |  | X |
| 7 | 0.64 | X | X |  | X |  | X |

(X = engaged)

Ring Gear/Sun Gear Tooth Ratios: $\frac{R1}{S1}=1.50, \frac{R2}{S2}=2.99, \frac{R3}{S3}=1.52$

| Ratio Spread | 7.00 |
|---|---|
| Ratio Steps |  |
| Rev/1 | -0.67 |
| 1/2 | 2.11 |
| 2/3 | 1.35 |
| 3/4 | 1.23 |
| 4/5 | 1.28 |
| 5/6 | 1.33 |
| 6/7 | 1.17 |

| | Ratios | 950 | 952 | 954 | 956 | 958 | 960 |
|---|---|---|---|---|---|---|---|
| Reverse | -2.95 | | X | X | X | X | |
| Neutral | 0.00 | | X | | X | X | |
| 1 | 5.02 | | X | | X | X | X |
| 2 | 2.58 | | X | X | X | | X |
| 3 | 1.40 | X | | X | X | | X |
| 4 | 1.16 | X | | X | | X | X |
| 5 | 1.00 | X | X | | | X | X |
| 6 | 0.78 | X | X | X | | X | |
| 7 | 0.63 | X | X | | X | X | |

(X = engaged)

Ring Gear/Sun Gear Tooth Ratios: $\frac{R1}{S1} = 1.54, \frac{R2}{S2} = 2.95, \frac{R3}{S3} = 2.50$

| Ratio Spread | 7.97 |
|---|---|
| Ratio Steps | |
| Rev/1 | -0.59 |
| 1/2 | 1.94 |
| 2/3 | 1.84 |
| 3/4 | 1.21 |
| 4/5 | 1.16 |
| 5/6 | 1.28 |
| 6/7 | 1.24 |

| | Ratios | 1050 | 1052 | 1054 | 1056 | 1058 | 1060 |
|---|---|---|---|---|---|---|---|
| Reverse | -7.23 | X | X | | | X | X |
| Neutral | 0.00 | X | | | | X | |
| 1 | 3.95 | X | | X | X | X | |
| 2 | 2.17 | X | | X | | X | X |
| 3 | 1.45 | X | | | X | X | X |
| 4 | 1.00 | X | | X | X | | X |
| 5 | 0.83 | X | X | | X | | X |
| 6 | 0.67 | X | X | X | X | | |
| 7 | 0.60 | | X | X | X | | X |

*(X = engaged)*

Ring Gear/Sun Gear Tooth Ratios: $\frac{R1}{S1}=2.95, \frac{R2}{S2}=1.72, \frac{R3}{S3}=1.52$

| Ratio Spread | 6.56 |
|---|---|
| Ratio Steps | |
| Rev/1 | -1.83 |
| 1/2 | 1.82 |
| 2/3 | 1.50 |
| 3/4 | 1.45 |
| 4/5 | 1.21 |
| 5/6 | 1.24 |
| 6/7 | 1.11 |

|  | Ratios | 1150 | 1152 | 1154 | 1156 | 1158 | 1160 |
|---|---|---|---|---|---|---|---|
| Reverse | -1.74 | X |  | X |  | X | X |
| Neutral | 0.00 | X |  | X |  |  | X |
| 1 | 4.02 | X | X | X |  |  | X |
| 2 | 2.38 |  | X | X | X |  | X |
| 3 | 1.67 | X |  | X | X |  | X |
| 4 | 1.00 | X |  | X | X | X |  |
| 5 | 0.81 | X |  |  | X | X | X |
| 6 | 0.60 |  | X |  | X | X | X |
| 7 | 0.54 | X | X |  |  | X | X |

(X = engaged)

Ring Gear/Sun Gear Tooth Ratios: $\frac{R1}{S1} = 1.74, \frac{R2}{S2} = 1.67, \frac{R3}{S3} = 2.92$

| Ratio Spread | 7.49 |
|---|---|
| Ratio Steps |  |
| Rev/1 | -0.43 |
| 1/2 | 1.69 |
| 2/3 | 1.43 |
| 3/4 | 1.67 |
| 4/5 | 1.24 |
| 5/6 | 1.34 |
| 6/7 | 1.12 |

|  | Ratios | 1250 | 1252 | 1254 | 1256 | 1258 | 1260 |
|---|---|---|---|---|---|---|---|
| Reverse | -2.95 | X |  |  | X | X | X |
| Neutral | 0.00 | X |  |  |  | X | X |
| 1 | 3.35 | X |  | X |  | X | X |
| 2 | 1.86 | X |  | X | X | X |  |
| 3 | 1.00 | X | X | X |  | X |  |
| 4 | 0.71 | X | X | X |  |  | X |
| 5 | 0.63 |  | X | X | X |  | X |
| 6 | 0.56 | X | X |  | X |  | X |
| 7 | 0.45 | X | X |  | X | X |  |

(X = engaged)

Ring Gear/Sun Gear Tooth Ratios: $\frac{R1}{S1}=2.95, \frac{R2}{S2}=1.68, \frac{R3}{S3}=1.72$

| Ratio Spread | 7.50 |
|---|---|
| Ratio Steps |  |
| Rev/1 | -0.88 |
| 1/2 | 1.80 |
| 2/3 | 1.86 |
| 3/4 | 1.41 |
| 4/5 | 1.12 |
| 5/6 | 1.12 |
| 6/7 | 1.26 |

| | Ratios | 1350 | 1352 | 1354 | 1356 | 1358 | 1360 |
|---|---|---|---|---|---|---|---|
| Reverse | -1.72 | X | | X | X | | X |
| Neutral | 0.00 | X | | X | X | | |
| 1 | 3.24 | X | | X | X | X | |
| 2 | 1.70 | X | | X | | X | X |
| 3 | 1.00 | X | X | X | | X | |
| 4 | 0.76 | X | X | | X | X | |
| 5 | 0.69 | | X | | X | X | X |
| 6 | 0.58 | X | X | | X | | X |
| 7 | 0.43 | X | X | X | | | X |

(X = engaged)

Ring Gear/Sun Gear Tooth Ratios: $\frac{R1}{S1} = 2.24, \frac{R2}{S2} = 2.89, \frac{R3}{S3} = 2.22$

| Ratio Spread | 7.45 |
|---|---|
| Ratio Steps | |
| Rev/1 | -0.53 |
| 1/2 | 1.91 |
| 2/3 | 1.70 |
| 3/4 | 1.31 |
| 4/5 | 1.11 |
| 5/6 | 1.18 |
| 6/7 | 1.34 |

| | Ratios | 1450 | 1452 | 1454 | 1456 | 1458 | 1460 |
|---|---|---|---|---|---|---|---|
| Reverse | -1.16 | | X | X | X | X | |
| Neutral | 0.00 | | X | | X | X | |
| 1 | 2.80 | X | X | | X | X | |
| 2 | 1.51 | X | X | | X | | X |
| 3 | 1.00 | X | X | | | X | X |
| 4 | 0.80 | X | X | X | | X | |
| 5 | 0.72 | X | | X | | X | X |
| 6 | 0.60 | | X | X | | X | X |
| 7 | 0.39 | | X | X | X | | X |

(X = engaged)

Ring Gear/Sun Gear Tooth Ratios: $\frac{R1}{S1} = 2.41, \frac{R2}{S2} = 1.80, \frac{R3}{S3} = 2.53$

| Ratio Spread | 7.21 |
|---|---|
| Ratio Steps | |
| Rev/1 | -0.41 |
| 1/2 | 1.86 |
| 2/3 | 1.51 |
| 3/4 | 1.25 |
| 4/5 | 1.11 |
| 5/6 | 1.20 |
| 6/7 | 1.54 |

| | Ratios | 1550 | 1552 | 1554 | 1556 | 1558 | 1560 |
|---|---|---|---|---|---|---|---|
| Reverse | -2.55 | X | | | X | X | X |
| Neutral | 0.00 | X | | | | X | X |
| 1 | 4.80 | X | | X | | X | X |
| 2 | 2.91 | X | | X | X | X | |
| 3 | 1.75 | | X | X | X | X | |
| 4 | 1.20 | X | X | | X | X | |
| 5 | 1.00 | X | X | X | X | | |
| 6 | 0.80 | X | X | | X | | X |
| 7 | 0.61 | | X | X | X | | X |

(X = engaged)

Ring Gear/Sun Gear Tooth Ratios: $\dfrac{R1}{S1}=1.53, \dfrac{R2}{S2}=1.54, \dfrac{R3}{S3}=1.52$

| Ratio Spread | 7.92 |
|---|---|
| Ratio Steps | |
| Rev/1 | -0.53 |
| 1/2 | 1.65 |
| 2/3 | 1.66 |
| 3/4 | 1.45 |
| 4/5 | 1.20 |
| 5/6 | 1.26 |
| 6/7 | 1.31 |

| | Ratios | 1650 | 1652 | 1654 | 1656 | 1658 | 1660 |
|---|---|---|---|---|---|---|---|
| Reverse | -6.29 | X | | | X | X | X |
| Neutral | 0.00 | X | | | | X | X |
| 1 | 5.12 | X | | X | | X | X |
| 2 | 2.70 | X | | X | X | X | |
| 3 | 1.23 | | X | X | X | X | |
| 4 | 1.00 | X | X | | X | X | |
| 5 | 0.85 | X | X | X | X | | |
| 6 | 0.76 | X | X | | X | | X |
| 7 | 0.68 | | X | X | X | | X |

(X = engaged)

Ring Gear/Sun Gear Tooth Ratios: $\frac{R1}{S1} = 1.97, \frac{R2}{S2} = 2.12, \frac{R3}{S3} = 2.50$

| Ratio Spread | 7.54 |
|---|---|
| Ratio Steps | |
| Rev/1 | -1.23 |
| 1/2 | 1.90 |
| 2/3 | 2.19 |
| 3/4 | 1.23 |
| 4/5 | 1.17 |
| 5/6 | 1.12 |
| 6/7 | 1.12 |

| | Ratios | 1750 | 1752 | 1754 | 1756 | 1758 | 1760 |
|---|---|---|---|---|---|---|---|
| Reverse | -2.56 | | X | X | X | | X |
| Neutral | 0.00 | | X | | X | | X |
| 1 | 3.87 | | X | | X | X | X |
| 2 | 1.66 | | X | X | X | X | |
| 3 | 1.21 | X | X | | X | X | |
| 4 | 1.00 | X | | X | X | X | |
| 5 | 0.79 | X | X | X | | X | |
| 6 | 0.61 | X | | X | | X | X |
| 7 | 0.52 | X | X | | | X | X |

(X = engaged)

Ring Gear/Sun Gear Tooth Ratios: $\frac{R1}{S1}=1.54, \frac{R2}{S2}=1.52, \frac{R3}{S3}=1.52$

| Ratio Spread | 7.39 |
|---|---|
| Ratio Steps | |
| Rev/1 | -0.66 |
| 1/2 | 2.33 |
| 2/3 | 1.38 |
| 3/4 | 1.21 |
| 4/5 | 1.26 |
| 5/6 | 1.31 |
| 6/7 | 1.16 |

FAMILY OF MULTI-SPEED PLANETARY TRANSMISSIONS HAVING A CLUTCHED INPUT AND ONE STATIONARY MEMBER

TECHNICAL FIELD

This invention relates to transmission families and, more particularly, to a family of transmissions having three planetary gearsets and six torque-transmitting mechanisms to provide seven forward speeds and one reverse speed.

BACKGROUND OF THE INVENTION

Automatic shifting power transmissions are currently used in a majority of the vehicles produced in the United States. These vehicles generally employ three- and four-speed power transmissions. More recently, a trend towards more ratios, such as five- and six-speed power transmissions, has been proposed. In fact, some manufacturers do provide five-speed transmissions. Many of the vehicles utilizing manual type transmissions or countershaft type transmissions employ five- and six-speed power transmissions.

The five- and six-speed power transmissions provide improved vehicle acceleration performance and fuel economy when compared with three- and four-speed transmissions. Seven-speed transmissions offer further vehicle acceleration performance and fuel economy improvement over five- and six-speed transmissions. However, seven-speed power transmissions have not been proposed due to the complexity of these assemblies, as well as size and cost. There are many current patents that describe five- and six-speed power transmissions. Some of the six-speed power transmission patents, especially those assigned to the assignee of the present invention, describe six-speed power transmissions in families, wherein one or more family members incorporate a seven-speed power transmission.

SUMMARY OF THE INVENTION

It is an object of the present invention to provide an improved seven-speed power transmission having three planetary gearsets.

In one aspect of the present invention, each of the three planetary gearsets has first, second, and third planetary members.

In another aspect of the present invention, the first member of the first planetary gearset is continuously interconnected with the first member of the second planetary gearset through an interconnecting member.

In yet another aspect of the present invention, the first member of the third planetary gearset is continuously interconnected with a transmission housing or stationary member.

In still another aspect of the present invention, the output shaft of the transmission is continuously interconnected with at least one member of one of the planetary gearsets, and the input shaft is interconnected with members of the planetary gearsets only through individually-operated selectively-engageable torque transmitting mechanisms.

In yet still another aspect of the present invention, the input shaft is interconnected with members of the planetary gearsets only through individually-operated selectively-engageable torque-transmitting mechanisms.

In a further aspect of the present invention, six torque-transmitting mechanisms are incorporated with the three planetary gearsets.

In a yet further aspect of the present invention, a first and second of the torque-transmitting mechanisms are interconnected between the input shaft and at least one member of one of the planetary gearsets.

In a yet further aspect of the present invention, a third of the torque-transmitting mechanisms selectively interconnects a member of one of the planetary gearsets with the output shaft, or another member of one of the planetary gearsets.

In a still further aspect of the present invention, a fourth of the torque-transmitting mechanisms selectively interconnects a member the first or second planetary gearset with another member of one of the planetary gearsets.

In a yet still further aspect of the present invention, a fifth of the torque-transmitting mechanisms selectively interconnects a member of the second or third planetary gearset with another member of one of the planetary gearsets.

In a yet further aspect of the present invention, a sixth of the torque-transmitting mechanisms selectively interconnects a member of one of the planetary gearsets with another member of one of the planetary gearsets or with a transmission housing.

In a yet still further aspect of the present invention, the six torque-transmitting mechanisms are selectively engageable in combinations of four to establish at least seven forward speed ratios and one reverse speed ratio.

The present invention is found in a family of low-content seven speed transmission mechanisms requiring only three planetary gearsets and six selectively engageable torque-transmitting mechanisms. Each of the planetary gearsets has three members. Five of the torque-transmitting mechanisms are rotating type torque-transmitting mechanisms, while the sixth torque-transmitting mechanism, in some family members is a rotating type torque-transmitting mechanism, while in other family members it is a stationary type torque-transmitting mechanism.

DESCRIPTION OF THE DRAWINGS

FIG. 3 is a schematic representation of a powertrain incorporating another family member of the present invention.

DESCRIPTION OF THE EXEMPLARY EMBODIMENTS

Figures 1, 2:
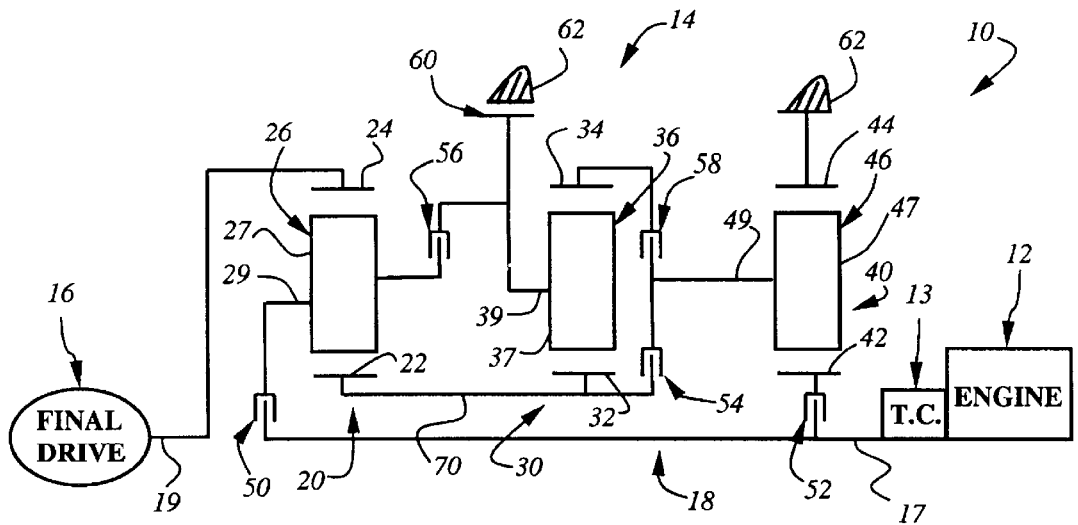
FIG. 1 is a schematic representation of a powertrain having a planetary transmission incorporating one family member of the present invention.
FIG. 2 is a truth table and chart providing a description of some of the operating characteristics and numerical values utilized with the powertrain shown in FIG. 1.

Referring to FIG. 1, wherein like characters represent the same or corresponding parts throughout the several views, there is seen a powertrain 10 having a conventional engine 12, a conventional torque converter 13, a planetary transmission 14, and a conventional final drive mechanism 16. The final drive mechanism 16 is, as is well known, connected conventionally with drive wheels of a vehicle, not shown.

The planetary transmission 14 includes an input shaft 17, a planetary gear arrangement 18, and an output shaft 19. The planetary gear arrangement 18 includes three planetary gearsets 20, 30, and 40, and six torque-transmitting mechanisms 50, 52, 54, 56, 58, and 60.

The planetary gearset 20 includes a sun gear member 22, a ring gear member 24, and a planet carrier assembly member 26. The planet carrier assembly member 26 includes a plurality of pinion gears 27 rotatably mounted on a planet carrier member 29 and disposed in meshing relationship with both the sun gear member 22 and the ring gear member 24.

While the schematic representation depicts a single pinion gear member 27, it is well known that the pinion gear members of a planetary transmission are equally distributed on the planet carrier 29 in groups of three or four to provide for the distribution of torque transmission between the sun gear member 22, the ring gear member 24, and the planet carrier assembly member 26.

The planetary gearset 30 includes a sun gear member 32, a ring gear member 34, and a planet carrier assembly member 36. The planet carrier assembly member 36 includes a plurality of pinion gears 37 rotatably mounted on a planet carrier member 39 and disposed in meshing relationship with both the sun gear member 32 and the ring gear member 34.

The planetary gearset 40 includes a sun gear member 42, a ring gear member 44, and a planet carrier assembly member 46. The planet carrier assembly member 46 includes a plurality of pinion gears 47 rotatably mounted on a planet carrier member 49 and disposed in meshing relationship with both the sun gear member 42 and the ring gear member 44.

Each of the planetary gearsets 20, 30, and 40 are commonly termed simple planetary gearsets. That is, a single pinion mesh between the sun gear member and the ring gear member such that when the planet carrier member is held stationary, the sun gear member and ring gear member of the planetary gearset will rotate in opposite directions.

Each of the torque-transmitting mechanisms 50, 52, 54, 56, 58, and 60 are conventional fluid-operated friction type torque-transmitting mechanisms. The torque-transmitting mechanisms 50, 52, 54, 56, and 58 are rotating type torque-transmitting mechanisms, such as conventional multiple disc type clutch assemblies. The torque-transmitting mechanism 60 is a stationary type torque-transmitting mechanism, commonly termed a brake, which can be either a multiple disc type assembly or a band type assembly.

The sun gear member 22 and sun the gear member 32 are continuously interconnected by an interconnecting member 70. The ring gear member 44 is continuously interconnected with a transmission housing 62 or other stationary component within the transmission. The ring gear member 24 is continuously connected for common rotation with the output shaft 19.

The input shaft 17 is selectively connectible with the planet carrier assembly member 26 through the torque-transmitting mechanism 50 and selectively connectible with the sun gear member 42 through the torque-transmitting mechanism 52. The interconnecting member 70 and therefore the sun gear members 22 and 32 are interconnected with the planet carrier assembly member 46 through the selectively engageable torque-transmitting mechanism 54. The planet carrier assembly member 26 is selectively connectible with the planet carrier assembly member 36 through the selectively engageable torque-transmitting mechanism 56. The planet carrier assembly member 36 is selectively connectible with the transmission housing 62 through the torque-transmitting mechanism 60. The ring gear member 34 is selectively interconnectible with the planet carrier assembly member 46 through the torque-transmitting mechanism 58.

As seen in the truth table of FIG. 2, the torque-transmitting mechanisms are engaged in combinations of four to establish a reverse speed ratio and seven forward speed ratios through the planetary gear arrangement 18 between the input shaft 17 and the output shaft 19. The truth table also provides an example of the numerical values that are available for each of the speed ratios when the ring gear/sun gear tooth ratios of the planetary gearsets 20, 30, and 40 are chosen as shown in R1/S1, R2/S2, and R3/S3, respectively. Also described in the chart of FIG. 2 is the numerical value of the ratios steps between adjacent forward speed ratios as well as the step ratio between the reverse and first forward speed ratio. Further information given in the chart is the overall ratio spread of the forward speed ratios.

To establish the reverse speed ratio, the torque-transmitting mechanisms 52, 54, 56, and 60 are selectively engaged. During the reverse speed ratio, the planet carrier assembly member 46, sun gear member 32, and sun gear member 22 are rotated at a speed determined by the speed of the sun gear member 42 and the ring gear/sun gear tooth ratio of the planetary gearset 40. The ring gear member 24 and therefore output shaft 19 are rotated at a speed determined by the speed of the sun gear member 22 and the ring gear/sun gear tooth ratio of the planetary gearset 20. The numerical value of the reverse speed ratio is determined by the ring gear/sun gear tooth ratios of the planetary gearsets 20 and 40.

The first forward speed ratio is established with the engagement of the torque-transmitting mechanisms 52, 56, 58, and 60. During the first forward speed ratio, the planet carrier assembly member 46 and ring gear member 34 are rotated at a speed determined by the speed of the sun gear member 42 and the ring gear/sun gear tooth ratio of the planetary gearset 40. The sun gear members 32 and 22 are rotated at a speed determined by the speed of the ring gear member 34 and the ring gear/sun gear tooth ratio of the planetary gearset 30. The ring gear member 24 and therefore output shaft 19 are rotated at a speed determined by the speed of the sun gear member 22 and the ring gear/sun gear tooth ratio of the planetary gearset 20. The numerical value of the first forward speed ratio is determined by the ring gear/sun gear tooth ratios of all three planetary gearsets 20, 30, and 40.

The second forward speed ratio is established with the engagement of the torque-transmitting mechanisms 52, 54, 56, and 58. During the second forward speed ratio, the ring gear member 24 is selectively interconnected with the planet carrier assembly member 46. The speed of the planet carrier assembly member 46 and therefore output shaft 19 are determined by the speed of sun gear member 42 and the ring gear/sun gear tooth ratio of the planetary gearset 40. The numerical value of the second forward speed ratio is determined by the ring gear/sun gear tooth ratio of the planetary gearset 40.

The third forward speed ratio is established with the engagement of the torque-transmitting mechanisms 50, 52, 56, and 58. During the third forward speed ratio, the planet carrier assembly member 46 and ring gear member 34 are rotated at a speed determined by the speed of the sun gear member 42 and the ring gear/sun gear tooth ratio of the planetary gearset 40. The sun gear members 32 and 22 are rotated at a speed determined by the speed of the ring gear member 34, the speed of the planet carrier assembly member 36, and the ring gear/sun gear tooth ratio of the planetary gearset 30. The ring gear member 24 and therefore output shaft 19 are rotated at a speed determined by the speed of the sun gear member 22, the speed of the planet carrier assembly member 26, and the ring gear/sun gear tooth ratio of the planetary gearset 20. The numerical value of the third forward speed ratio is determined by the ring gear/sun gear tooth ratios of all three planetary gearsets 20, 30, and 40.

The fourth forward speed ratio is established with the engagement of the torque-transmitting mechanisms 50, 54, 56, and 58. This combination of engagements provides for the planetary gearsets 30 and 20 to rotate in unison with the input shaft 17. Therefore, the ring gear member 24 and output shaft 19 also rotate in unison with the input shaft 17, and the numerical value of the fourth forward speed ratio is one.

The fifth forward speed ratio is established with the engagement of the torque-transmitting mechanisms 50, 52, 54, and 58. During the fifth forward speed ratio, the planet carrier assembly member 36, and the sun gear members 32 and 22 are rotated at a speed determined by the speed of the sun gear member 42 and the ring gear/sun gear tooth ratio of the planetary gearset 40. The ring gear member 24 and therefore output shaft 19 are rotated at a speed determined by the speed of the sun gear member 22, the speed of the planet carrier assembly member 26, and the ring gear/sun gear tooth ratio of the planetary gearset 20. The numerical value of the fifth forward speed ratio is determined by the ring gear/sun gear tooth ratio of the planetary gearsets 20 and 40.

The sixth forward speed ratio is established with the engagement of the torque-transmitting mechanisms 50, 54, 58, and 60. During the sixth forward speed ratio, the sun gear member 22 is held stationary. The ring gear member 24 and therefore output shaft 19 are rotated at a speed determined by the speed of the planet carrier assembly member 26 and the ring gear/sun gear tooth ratio of the planetary gearset 20. The numerical value of the sixth forward speed ratio is determined by the ring gear/sun gear tooth ratio of the planetary gearset 20.

The seventh forward speed ratio is established with the engagement of the torque-transmitting mechanisms 50, 52, 58, and 60. During the seventh forward speed ratio, the planet carrier assembly member 46 and ring gear member 34 are rotated at a speed determined by the speed of the sun gear member 42 and the ring gear/sun gear tooth ratio of the planetary gearset 40. The sun gear members 32 and 22 are rotated at a speed determined by the speed of the ring gear member 34 and the ring gear/sun gear tooth ratio of the planetary gearset 30. The ring gear member 24 and therefore output shaft 19 are rotated at a speed determined by the speed of the sun gear member 22, the speed of the planet carrier assembly member 26, and the ring gear/sun gear tooth ratio of the planetary gearset 20. The numerical value of the seventh forward speed ratio is determined by the ring gear/sun gear tooth ratios of all three planetary gearsets 20, 30, and. 40.

It will be noted, particularly by those skilled in the art, that each of the single step ratio interchanges in the forward direction are of the single step variety. That is, only a single pair of torque-transmitting mechanisms are interchanged or swapped during the ratio change. For example, in a ratio change from first ratio to second ratio, the torque-transmitting mechanisms 60 and 54 are interchanged.

A powertrain 110, shown in FIG. 3, includes the engine 12, the torque converter 13, a planetary transmission 114, and the final drive mechanism 16. The planetary transmission 114 includes the input shaft 17, a planetary gear arrangement 118, and the output shaft 19. The planetary gear arrangement 118 includes three planetary gearsets 120, 130, and 140, and six torque-transmitting mechanisms 150, 152, 154, 156, 158, and 160. All of the torque-transmitting mechanisms are of the rotating type torque-transmitting mechanisms.

The planetary gearset 120 includes a sun gear member 122, a ring gear member 124, and a planet carrier assembly member 126. The planet carrier assembly member 126 includes a plurality of pinion gears 127 rotatably mounted on a planet carrier member 129 and disposed in meshing relationship with both the sun gear member 122 and the ring gear member 124.

The planetary gearset 130 includes a sun gear member 132, a ring gear member 134, and a planet carrier assembly member 136. The planet carrier assembly member 136 includes a plurality of pinion gears 137 rotatably mounted on a planet carrier member 139 and disposed in meshing relationship with both the sun gear member 132 and the ring gear member 134.

The planetary gearset 140 includes a sun gear member 142, a ring gear member 144, and a planet carrier assembly member 146. The planet carrier assembly member 146 includes a plurality of pinion gears 147 rotatably mounted on a planet carrier member 149 and disposed in meshing relationship with both the sun gear member 142 and the ring gear member 144.

The sun gear member 122 is continuously interconnected with the planet carrier assembly member 136 through an interconnecting member 170. The sun gear member 142 is continuously interconnected with the transmission housing 62. The ring gear member 124 is continuously interconnected with the output shaft 19.

The input shaft 17 is selectively interconnected with the planet carrier assembly member 126 through the torque-transmitting mechanism 150 and selectively connected with the sun gear member 132 through the torque-transmitting mechanism 152. The ring gear member 144 is selectively connectible with the interconnecting member 170 through the torque-transmitting mechanism 154 and selectively connectible with the ring gear member 134 through the torque-transmitting mechanism 158. The planet carrier assembly member 146 is selectively connectible with the planet carrier assembly member 126 through the torque-transmitting mechanism 156 and selectively connectible with the ring gear member 134 through the torque-transmitting mechanism 160.

Figure 4:
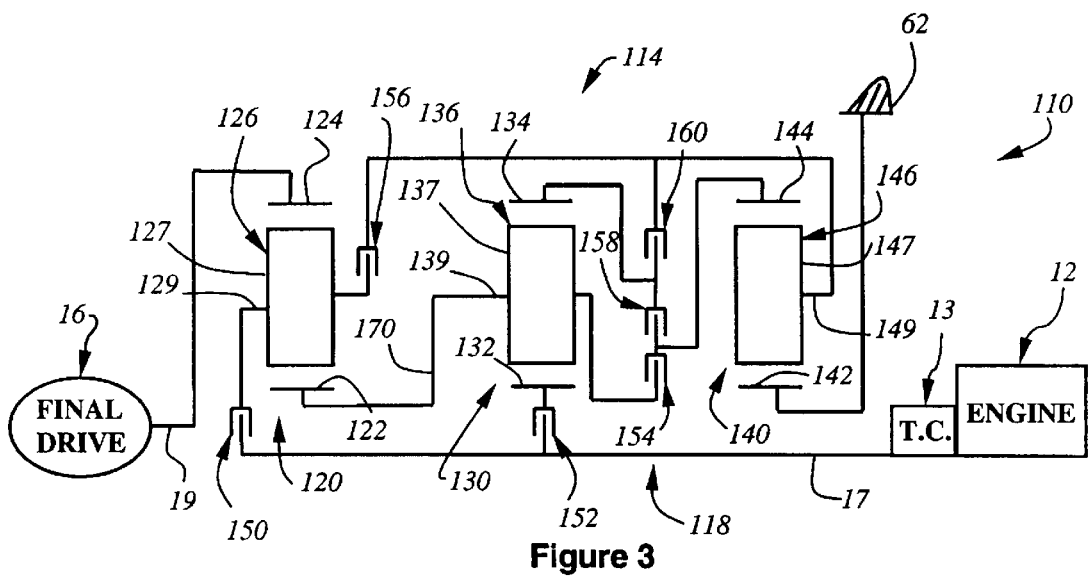
FIG. 4 is a truth table and chart describing some of the operating characteristics and numerical values that can be utilized with the family member shown in FIG. 3.

As seen in the truth table of FIG. 4, the torque-transmitting mechanisms are selectively engaged in combinations of four to establish eight forward speed ratios and one reverse speed ratio between the input shaft 17 and the output shaft 19 through the planetary gear arrangement 118. The truth table of FIG. 4 also provides a set of numerical values for the forward speed ratios as well as the reverse speed ratio. These numerical values are established utilizing the ring gear/sun gear tooth ratios of the planetary gearsets 120, 130, and 140 as given in FIG. 4 as R1/S1, R2/S2, and R3/S3, respectively. Also provided in FIG. 4 is a chart of the numerical value of the ratio steps between adjacent forward speed ratios when the given ratio numbers are employed. The chart of FIG. 4 also provides the step between the reverse and first forward speed ratio as well as the numerical value of the overall ratio spread for the forward ratios.

The reverse speed ratio is established with the engagement of the torque-transmitting mechanisms 152, 156, 158, and 160. During the reverse speed ratio, the planet carrier assembly member 136 and sun gear member 122 are rotated at a speed determined by the speed of the sun gear member 132 and the ring gear/sun gear tooth ratio of the planetary gearset 130. The ring gear member 124 and therefore output shaft 19 are rotated at a speed determined by the speed of the sun gear member 122 and the ring gear/sun gear tooth ratio of the planetary gearset 120. The numerical value of the reverse speed ratio is determined by the ring gear/sun gear tooth ratios of the planetary gearsets 120 and 130.

The first forward speed ratio is established with the engagement of the torque-transmitting mechanisms 152, 154, 156, and 160. It might be noted that the interchange between the reverse and first forward speed ratio is accomplished with the swapping or the interchange of torque-transmitting mechanisms 154 and 158. The other torque-transmitting mechanisms 152, 156, and 160 can remain engaged in the neutral condition. During the first forward speed ratio, the ring gear member 134, the planet carrier assembly member 146, and the planet carrier assembly member 126 are rotated at a speed determined by the speed of the sun gear member 132, the speed of the planet carrier assembly member 136, and the ring gear/sun gear tooth ratio of the planetary gearset 130. The ring gear member 134, the planet carrier assembly member 136, and the ring gear member 122 are rotated at a speed determined by the speed of the planet carrier assembly member 146 and the ring gear/sun gear tooth ratio of the planetary gearset 140. The ring gear member 124 and therefore output shaft 19 are rotated at a speed determined by the speed of the sun gear member 122, the speed of the planet carrier assembly member 126, and the ring gear/sun gear tooth ratio of the planetary gearset 120. The numerical value of the first forward speed ratio is determined by the ring gear/sun gear tooth ratios of all three planetary gearsets 120, 130, and 140.

The second forward speed ratio is established with the engagement of the torque-transmitting mechanisms 152, 154, 156, and 158. During the second forward speed ratio, the planet carrier assembly members 146 and 126 are rotated at a speed determined by the speed of the ring gear member 144 and the ring gear/sun gear tooth ratio of the planetary gearset 140. The ring gear member 124 and therefore output shaft 19 are rotated at a speed determined by the speed of the sun gear member 122, the speed of the planet carrier assembly member 126, and the ring gear/sun gear tooth ratio of the planetary gearset 120. The numerical value of the second forward speed ratio is determined by the ring gear/sun gear tooth ratios of the planetary gearsets 120 and 140.

The third forward speed ratio is established with the engagement of the torque-transmitting mechanisms 150, 154, 156, and 158. During the third forward speed ratio, the ring gear member 144, the planet carrier assembly member 136, and the sun gear member 122 are rotated at a speed determined by the speed of the of the planet carrier assembly member 146 and the ring gear/sun gear tooth ratio of the planetary gearset 140. The ring gear member 124 and therefore output shaft 19 are rotated at a speed determined by the speed of the sun gear member 122, the speed of the planet carrier assembly member 126, and the ring gear/sun gear tooth ratio of the planetary gearset 120. The numerical value of the third forward speed ratio is determined by the ring gear/sun gear tooth ratios of the planetary gearsets 120 and 140.

The fourth forward speed ratio is established with the engagement of the torque-transmitting mechanisms 150, 152, 156, and 158. During the fourth forward speed ratio, the ring gear members 144 and 134 are rotated at a speed determined by the speed of the planet carrier assembly member 146 and the ring gear/sun gear tooth ratio of the planetary gearset 140. The planet carrier assembly member 136 and sun gear member 122 are rotated at a speed determined by the speed of the sun gear member 132, the speed of the ring gear member 134, and ring gear/sun gear tooth ratio of the planetary gearset 130. The ring gear member 124 and therefore output shaft 19 are rotated at a speed determined by the speed of the planet carrier assembly member 126, the speed of the sun gear member 122, and the ring gear/sun gear tooth ratio of the planetary gearset 120. The numerical value of the fourth forward speed ratio is determined by the ring gear/sun gear tooth ratios of all three planetary gearsets 120, 130, and 140.

The fifth forward speed ratio is established with the engagement of the torque-transmitting mechanisms 150, 152, 154, and 158. During the fifth forward speed ratio, the planetary gearset 120 rotates as a single member in unison with the input shaft 17. Therefore, the output shaft 19 also rotates in unison with the input shaft 17 and the numerical value of the fifth forward speed ratio is one.

The sixth forward speed ratio is established with the engagement of the torque-transmitting mechanisms 150, 152, 154, and 160. During the sixth forward speed ratio, the ring gear member 134 and planet carrier assembly member 146 are rotated at a speed determined by the speed of the sun gear member 132, the speed of the planet carrier assembly member 136, and the ring gear/sun gear tooth ratio of the planetary gearset 130. The ring gear member 144, planet carrier assembly member 136, and sun gear member 122 are rotated at a speed determined by the speed of the planet carrier assembly member 146 and the ring gear/sun gear tooth ratio of the planetary gearset 140. The ring gear member 124 and therefore output shaft 19 are rotated at a speed determined by the speed of the planet carrier assembly member 126, the speed of the sun gear member 122, and the ring gear/sun gear tooth ratio of the planetary gearset 120. The numerical value of the sixth forward speed ratio is determined by the ring gear/sun gear tooth ratios of all three planetary gearsets 120, 130, and 140.

The seventh forward speed ratio is established with the engagement of the torque-transmitting mechanisms 150, 152, 158, and 160. During the seventh forward speed ratio, the planet carrier assembly member 136 and sun gear member 122 are rotated at a speed determined by the speed of the speed of the sun gear member 132 and the ring gear/sun gear tooth ratio of the planetary gearset 130. The ring gear member 124 and therefore output shaft 19 are rotated at a speed determined by the speed of the planet carrier assembly member 126, the speed of the sun gear member 122, and the ring gear/sun gear tooth ratio of the planetary gearset 120. The numerical value of the seventh forward speed ratio is determined by the ring gear/sun gear tooth ratios of the planetary gearsets 120 and 130.

The eighth forward speed ratio is established with the engagement of the torque-transmitting mechanisms 150, 154, 158, and 160. During the eighth forward speed ratio, the sun gear member 122 is held stationary. The ring gear member 124 and therefore output shaft 19 are rotated at a speed determined by the speed of the planet carrier assembly member 126 and the ring gear/sun gear tooth ratio of the planetary gearset 120. The numerical value of the eighth forward speed ratio is determined by the ring gear/sun gear tooth ratio of the planetary gearset 120.

Figures 5, 6:
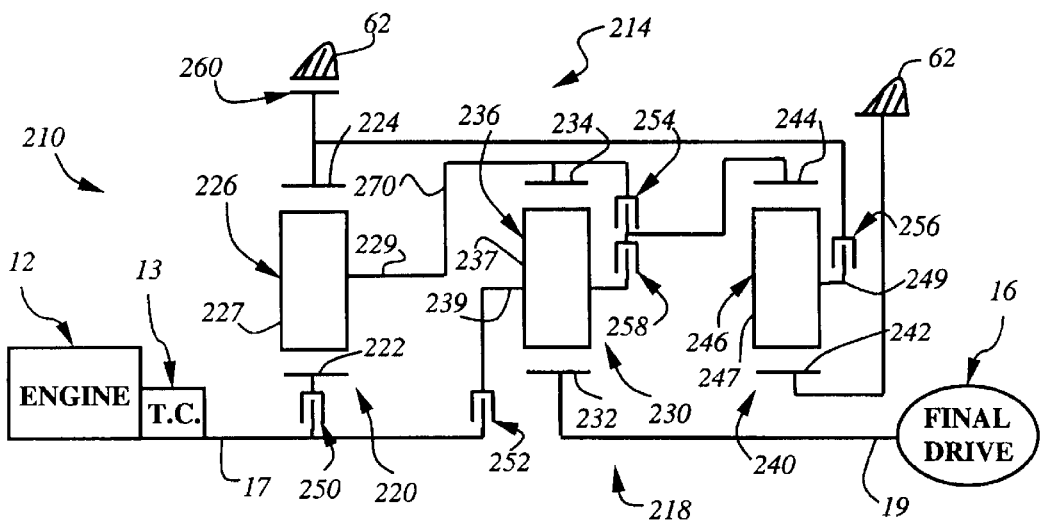
FIG. 5 is a schematic representation of a powertrain incorporating another family member of the present invention.
FIG. 6 is a truth table and chart describing some of the operating characteristics and numerical values that can be utilized with the family member shown in FIG. 5.

A powertrain 210, shown in FIG. 5, includes the engine 12, the torque converter 13, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240, and six torque-transmitting mechanisms 250, 252, 254, 256, 258, and 260. The torque-transmitting mechanism 260 is a stationary type torque-transmitting mechanism or brake, while the remaining torque-transmitting mechanisms are of the rotating type torque-transmitting mechanisms.

The planetary gearset 220 includes a sun gear member 222, a ring gear member 224, and a planet carrier assembly member 226. The planet carrier assembly member 226 includes a plurality of pinion gears 227 rotatably mounted on a planet carrier member 229 and disposed in meshing relationship with both the sun gear member 222 and the ring gear member 224.

The planetary gearset 230 includes a sun gear member 232, a ring gear member 234, and a planet carrier assembly member 236. The planet carrier assembly member 236 includes a plurality of pinion gears 237 rotatably mounted on a planet carrier member 239 and disposed in meshing relationship with both the sun gear member 232 and the ring gear member 234.

The planetary gearset 240 includes a sun gear member 242, a ring gear member 244, and a planet carrier assembly member 246. The planet carrier assembly member 246 includes a plurality of pinion gears 247 rotatably mounted on a planet carrier member 249 and disposed in meshing relationship with both the sun gear member 242 and the ring gear member 244.

The planet carrier assembly member 226 and ring gear member 234 are continuously interconnected by an interconnecting member 270. The sun gear member 242 is continuously connected with the transmission housing 62. The output shaft 19 is continuously connected with the sun gear member 232.

The input shaft 17 is selectively connectible with the sun gear member 222 through the torque-transmitting mechanism 250 and selectively connectible with the planet carrier assembly member 236 through the torque-transmitting mechanism 252. The ring gear member 244 is selectively connectible with the interconnecting member 270 through the torque-transmitting mechanism 254 and selectively connectible with the planet carrier assembly member 236 through the torque-transmitting mechanism 258. The ring gear member 224 is selectively connectible with the transmission housing 62 through the torque-transmitting mechanism 260 and selectively connectible with the planet carrier assembly member 246 through the torque-transmitting mechanism 256.

The truth table of FIG. 6 describes the sequence and combinations of engagements for the torque-transmitting mechanisms in order to provide seven forward speed ratios and one reverse speed ratio between the input shaft 17 and the output shaft 19 through the planetary gear arrangement 218. Also given in the truth table is a set of numerical values that can be utilized with the planetary gear arrangement 218. These numerical values are established using the ring gear/sun gear tooth ratios of the planetary gearsets 220, 230, and 240, which are given as R1/S1, R2/S2, and R3/S3, respectively, in FIG. 6. Also given in given in FIG. 6 is a chart of the numerical values for the ratio steps between adjacent forward speed ratios as well as between the reverse and first forward speed ratio. The overall ratio spread of the forward speed ratios is also given in FIG. 6.

The reverse speed ratio is established with the engagement of the torque-transmitting mechanisms 250, 256, 258, and 260. During the reverse speed ratio, the planet carrier assembly member 226 and ring gear member 234 are rotated at a speed determined by the speed of the sun gear member 222 and the ring gear/sun gear tooth ratio of the planetary gearset 220. The speed of the sun gear member 232 and therefore output shaft 19 are determined by the speed of the ring gear member 234 and the ring gear/sun gear tooth ratio of the planetary gearset 230. The numerical value of the reverse speed ratio is determined by the ring gear/sun gear tooth ratios of the planetary gearsets 220 and 230.

The first forward speed ratio is established with the engagement of the torque-transmitting mechanisms 250, 254, 258, and 260. During the first forward speed ratio the planetary gearset 230 rotates as a unit. The speed of the planet carrier assembly member 226 and the planetary gearset 230 is determined by the speed of the sun gear member 222 and the ring gear/sun gear tooth ratio of the planetary gearset 220. The numerical value for the first forward speed ratio is determined by the ring gear/sun gear tooth ratio of the planetary gearset 220.

The second forward speed ratio is established with the engagement of the torque-transmitting mechanisms 250, 254, 256, and 258. During the second forward speed ratio, the ring gear member 224 and planet carrier assembly member 246 are rotated at a speed determined by the speed of the sun gear member 222, the speed of the planet carrier assembly member 226, and the ring gear/sun gear tooth ratio of the planetary gearset 220. The ring gear member 244 and therefore the planetary gearset 230, as well as the planet carrier assembly member 226, are rotated at a speed determined by the speed of the planet carrier assembly member 246 and the ring gear/sun gear tooth ratio of the planetary gearset 240. The numerical value of the second forward speed ratio is determined by the ring gear/sun gear tooth ratios of the planetary gearsets 220 and 240.

The third forward speed ratio is established with the engagement of the torque-transmitting mechanisms 252, 254, 256, and 258. During the third forward speed ratio, the planetary gearset 230 rotates as a single unit such that the input shaft 17 and the output shaft 19 rotate at the same speed. The numerical value of the third forward speed ratio is one.

The fourth forward speed ratio is established with the engagement of the torque-transmitting mechanisms 250, 252, 256, and 258. During the fourth forward speed ratio, the planet carrier assembly member 246 and ring gear member 224 are rotated at a speed determined by the speed of the ring gear member 244 and the ring gear/sun gear tooth ratio of the planetary gearset 240. The planet carrier assembly member 226 and ring gear member 234 are rotated at a speed determined by the speed of the ring gear member 224, the speed of the sun gear member 222, and the ring gear/sun gear tooth ratio of the planetary gearset 220. The sun gear member 232 and therefore output shaft 19 are rotated at a speed determined by the speed of the ring gear member 234, the speed of the planet carrier assembly member 236, and the ring gear/sun gear tooth ratio of the planetary gearset 230. The numerical value of the fourth forward speed ratio is determined by the ring gear/sun gear tooth ratios of all three planetary gearsets 220, 230, and 240.

The fifth forward speed ratio is established with the engagement of the torque-transmitting mechanisms 250, 252, 254, and 256. During the fifth forward speed ratio, the ring gear member 224 and planet carrier assembly member 246 are rotated at a speed determined by the speed of the sun gear member 222, the speed of the planet carrier assembly member 226, and the ring gear/sun gear tooth ratio of the planetary gearset 220. The ring gear member 244, the ring gear member 234, and the planet carrier assembly member 226 are rotated at a speed determined by the speed of the planet carrier assembly member 246 and the ring gear/sun gear tooth ratio of the planetary gearset 240. The sun gear member 232 and output shaft 19 are rotated at a speed determined by the speed of the ring gear member 234, the speed of the planet carrier assembly member 236, and the ring gear/sun gear tooth ratio of the planetary gearset 230. The numerical value of the fifth forward speed ratio is determined by the ring gear/sun gear tooth ratios of all three planetary gearsets 220, 230, and 240.

The sixth forward speed ratio is established with the engagement of the torque-transmitting mechanisms 250, 252, 256, and 260. During the sixth forward speed ratio, the planet carrier assembly member 226 and ring gear member 234 are rotated at a speed determined by the speed of the sun gear member 222 and the ring gear/sun gear tooth ratio of the planetary gearset 220. The speed of the sun gear member 232 and therefore output shaft 19 are rotated at a speed determined by the speed of the ring gear member 234, the speed of the planet carrier assembly member 236, and the ring gear/sun gear tooth ratio of the planetary gearset 230. The numerical value of the sixth forward speed ratio is determined by the ring gear/sun gear tooth ratios of the planetary gearsets 220 and 230.

The seventh forward speed ratio is established with the engagement of the torque-transmitting mechanisms 252, 254, 256, and 260. During the seventh forward speed ratio, the ring gear member 234 is effectively grounded by the combinations of engagements found therein. The sun gear member 232 and therefore output shaft 19 are rotated at a speed determined by the speed of the planet carrier assembly member 236 and the ring gear/sun gear tooth ratio of the planetary gearset 230. The numerical value of the seventh forward speed ratio is determined by the ring gear/sun gear tooth ratio of the planetary gearset 230.

Figures 7, 8:
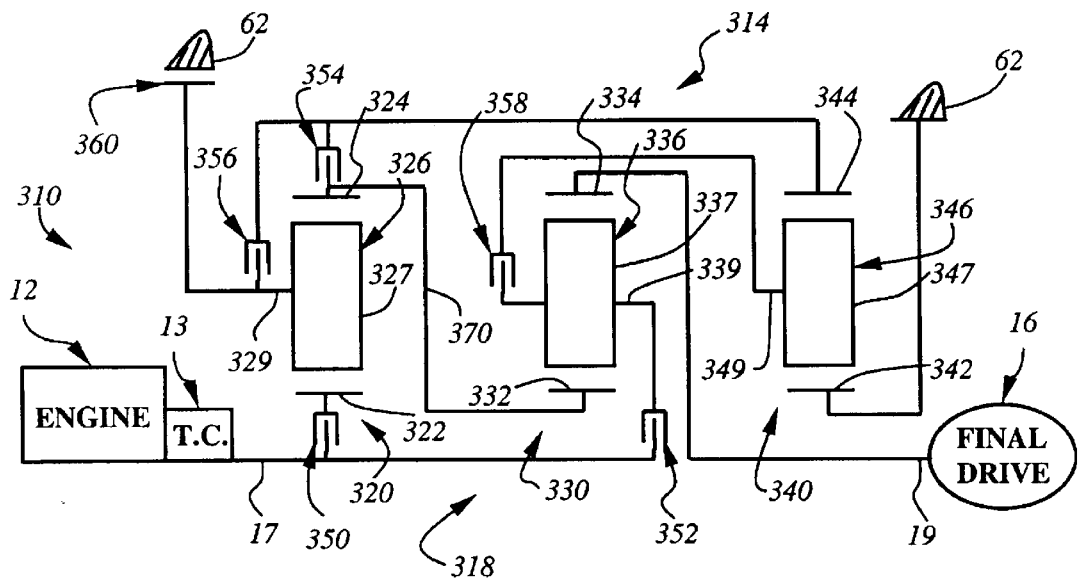
FIG. 7 is a schematic representation of a powertrain incorporating another family member of the present invention.
FIG. 8 is a truth table and chart describing some of the operating characteristics and numerical values that can be utilized with the family member shown in FIG. 7.

A powertrain 310, shown in FIG. 7, includes the engine 12, the torque converter 13, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340, and six torque-transmitting mechanisms 350, 352, 354, 356, 358, and 360. The torque-transmitting mechanism 360 is a stationary type torque-transmitting mechanism or brake, while the remaining torque-transmitting mechanisms are of the rotating type torque-transmitting mechanisms.

The planetary gearset 320 includes a sun gear member 322, a ring gear member 324, and a planet carrier assembly member 326. The planet carrier assembly member 326 includes a plurality of pinion gears 327 rotatably mounted on a planet carrier member 329 and disposed in meshing relationship with both the sun gear member 322 and the ring gear member 324.

The planetary gearset 330 includes a sun gear member 332, a ring gear member 334, and a planet carrier assembly member 336. The planet carrier assembly member 336 includes a plurality of pinion gears 337 rotatably mounted on a planet carrier member 339 and disposed in meshing relationship with both the sun gear member 332 and the ring gear member 334.

The planetary gearset 340 includes a sun gear member 342, a ring gear member 344, and a planet carrier assembly member 346. The planet carrier assembly member 346 includes a plurality of pinion gears 347 rotatably mounted on a planet carrier member 349 and disposed in meshing relationship with both the sun gear member 342 and the ring gear member 344.

The ring gear member 324 and sun gear member 332 are continuously interconnected by an interconnecting member 370, which is selectively connectible with the ring gear member 344 through the torque-transmitting mechanism 354 and selectively connectible with the planet carrier assembly member 326 through the torque-transmitting mechanism 354. The sun gear member 342 is continuously connected with the transmission housing 62. The output shaft 19 is continuously connected with the ring gear member 334.

The input shaft 17 is selectively connectible with the sun gear member 322 through the torque-transmitting mechanism 350 and selectively connectible with the planet carrier assembly member 336 through the torque-transmitting mechanism 352. The planet carrier assembly member 336 is selectively connectible with the planet carrier assembly member 346 through the torque-transmitting mechanism 358. The planet carrier assembly member 336 is selectively connectible with the ring gear member 344 through the torque-transmitting mechanism 356 and with the transmission housing 62 through the torque-transmitting mechanism 360.

The truth table of FIG. 8 describes the engagement sequence and combinations of the torque-transmitting mechanisms in order to establish seven forward speed ratios and one reverse speed ratio through the planetary gear arrangement 318 between the input shaft 17 and the output shaft 19. Also provided in the truth table is a set of numerical values for the speed ratios of the planetary gear arrangement 318. The chart in FIG. 8 provides the numerical values of the ratio steps between adjacent forward speed ratios as well as between the reverse and first forward speed ratio. The overall ratio spread is also given in the chart of FIG. 8.

The reverse speed ratio is established with the engagement of the torque-transmitting mechanisms 350, 354, 358, and 360. During the reverse speed ratio, the ring gear member 324, sun gear member 332, and ring gear member 344 are rotated at a speed determined by the speed of the sun gear member 322 and the ring gear/sun gear tooth ratio of the planetary gearset 320. The planet carrier assembly member 346 and planet carrier assembly member 336 are rotated at a speed determined by the speed of the ring gear member 344 and the ring gear/sun gear tooth ratio of the planetary gearset 340. The ring gear member 334 and therefore output shaft 19 are rotated at a speed determined by the speed of the sun gear member 332, the speed of the planet carrier assembly member 336, and the ring gear/sun gear tooth ratio of the planetary gearset 330. The numerical value of the reverse speed ratio is determined by the ring gear/sun gear tooth ratios of all three planetary gearsets 320, 330, and 340.

The first forward speed ratio is established with the engagement of the torque-transmitting mechanisms 350, 356, 358, and 360. During the first forward speed ratio, the ring gear member 324 and sun gear member 332 are rotated at a speed determined by the speed of the sun gear member 322 and the ring gear/sun gear tooth ratio of the planetary gearset 320. The ring gear member 334 and therefore output shaft 19 are rotated at a speed determined by the speed of the sun gear member 332 and the ring gear/sun gear tooth ratio of the planetary gearset 330. The numerical value of the first forward speed ratio is determined by the ring gear/sun gear tooth ratios of the planetary gearsets 320 and 330.

The second forward speed ratio is established with the engagement of the torque-transmitting mechanisms 350, 354, 356, and 358. During the second forward speed ratio, the planetary gearset 320, the sun gear member 332, and the ring gear member 344 all rotate in unison with the input shaft 17. The planet carrier assembly member 346 and planet carrier assembly member 336 are rotated at a speed determined by the speed of the ring gear member 344 and the ring gear/sun gear tooth ratio of the planetary gearset 340. The ring gear member 334 and therefore output shaft 19 are rotated at a speed determined by the speed of the sun gear member 332, the speed of the planet carrier assembly member 336, and the ring gear/sun gear tooth ratio of the planetary gearset 330. The numerical value of the second forward speed ratio is determined by the ring gear/sun gear tooth ratios of the planetary gearsets 330 and 340.

The third forward speed ratio is established with the engagement of the torque-transmitting mechanisms 350, 352, 356, and 358. During the third forward speed ratio, the ring gear member 344 and planet carrier assembly member 326 are rotated at a speed determined by the speed of the planet carrier assembly member 346 and the ring gear/sun gear tooth ratio of the planetary gearset 340. The ring gear member 324 and sun gear member 332 are rotated at a speed determined by the speed of the sun gear member 322, the speed of the planet carrier assembly member 326, and the ring gear/sun gear tooth ratio of the planetary gearset 320. The ring gear member 334 and therefore output shaft 19 are rotated at a speed determined by the speed of the sun gear member 332, the speed of the planet carrier assembly member 336, and the ring gear/sun gear tooth ratio of the planetary gearset 330. The numerical value of the third forward speed ratio is determined by the ring gear/sun gear tooth ratios of all three planetary gearsets 320, 330, and 340.

The fourth forward speed ratio is established with the engagement of the torque-transmitting mechanisms 350, 352, 354, and 358. During the fourth forward speed ratio, the ring gear member 344 and sun gear member 332 are rotated at a speed determined by the speed of the planet carrier assembly member 346 and the ring gear/sun gear tooth ratio of the planetary gearset 340. The ring gear member 334 and therefore output shaft 19 are rotated at a speed determined by the speed of the sun gear member 332, the speed of the planet carrier assembly member 336, and the ring gear/sun gear tooth ratio of the planetary gearset 330. The numerical value of the fourth forward speed ratio is determined by the ring gear/sun gear tooth ratios of the planetary gearsets 330 and 340.

The fifth forward speed ratio is established with the engagement of the torque-transmitting mechanisms 350, 352, 354, and 356. During the fifth forward speed ratio, the planetary gearset 330 is rotated in unison with the input shaft 17. The output shaft 19 also rotates in unison with the planetary gearset 330. Therefore the numerical value of the fifth forward speed ratio is one.

The sixth forward speed ratio is established with the engagement of the torque-transmitting mechanisms 352, 354, 356, and 360. During the sixth forward speed ratio, the speed of the ring gear member 334 and therefore output shaft 19 is determined by the speed of the planet carrier assembly member 336 and the ring gear/sun gear tooth ratio of the planetary gearset 330. The numerical value of the sixth forward speed ratio is determined by the ring gear/sun gear tooth ratio of the planetary gearset 330.

The seventh forward speed ratio is established with the engagement of the torque-transmitting mechanisms 350, 352, 354, and 360. During the seventh forward speed ratio, the ring gear member 324 and sun gear member 332 are rotated at a speed determined by the speed of the sun gear member 322 and the ring gear/sun gear tooth ratio of the planetary gearset 320. The ring gear member 334 and therefore output shaft 19 are rotated at a speed determined by the speed of the sun gear member 332, the speed of the planet carrier assembly member 336, and the ring gear/sun gear tooth ratio of the planetary gearset 330. The numerical value of the seventh forward speed ratio is determined by the ring gear/sun gear tooth ratios of the planetary gearsets 320 and 330.

Figures 9, 10:
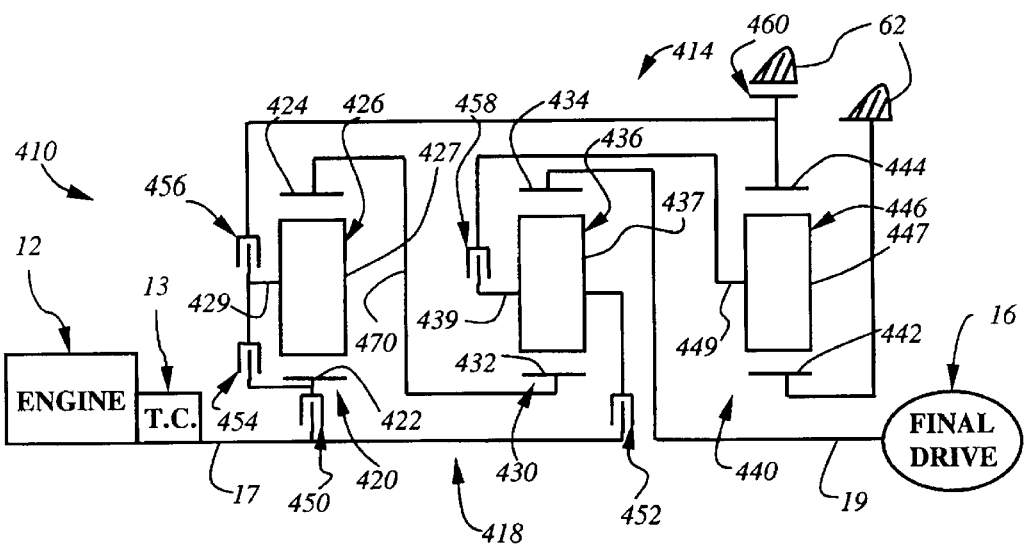
FIG. 9 is a schematic representation of a powertrain incorporating another family member of the present invention.
FIG. 10 is a truth table and chart describing some of the operating characteristics and numerical values that can be utilized with the family member shown in FIG. 9.

A powertrain 410, shown in FIG. 9, includes the engine 12, the torque converter 13, a planetary transmission 414, and the final drive mechanism 16. The planetary transmission 414 includes the input shaft 17, a planetary gear arrangement 418, and the output shaft 19. The planetary gear arrangement 418 includes three planetary gearsets 420, 430, and 440, and six torque-transmitting mechanisms 450, 452, 454, 456, 458, and 460. The torque-transmitting mechanism 460 is a stationary type torque-transmitting mechanism or brake, while the remaining torque-transmitting mechanisms are of the rotating type torque-transmitting mechanisms.

The planetary gearset 420 includes a sun gear member 422, a ring gear member 424, and a planet carrier assembly member 426. The planet carrier assembly member 426 includes a plurality of pinion gears 427 rotatably mounted on a planet carrier member 429 and disposed in meshing relationship with both the sun gear member 422 and the ring gear member 424.

The planetary gearset 430 includes a sun gear member 432, a ring gear member 434, and a planet carrier assembly member 436. The planet carrier assembly member 436 includes a plurality of pinion gears 437 rotatably mounted on a planet carrier member 439 and disposed in meshing relationship with both the sun gear member 432 and the ring gear member 434.

The planetary gearset 440 includes a sun gear member 442, a ring gear member 444, and a planet carrier assembly member 446. The planet carrier assembly member 446 includes a plurality of pinion gears 447 rotatably mounted on a planet carrier member 449 and disposed in meshing relationship with both the sun gear member 442 and the ring gear member 444.

The ring gear member 424 and sun gear member 432 are continuously interconnected by an interconnecting member 470. The sun gear member 442 is continuously connected with the transmission housing 62. The output shaft 19 is continuously connected with the ring gear member 434.

The input shaft 17 is selectively connectible with the sun gear member 422 through the torque-transmitting mechanism 450 and selectively connectible with the planet carrier assembly member 436 through the torque-transmitting mechanism 452. The planet carrier assembly member 426 is selectively connectible with the sun gear member 422 through the torque-transmitting mechanism 454 and selectively connectible with the ring gear member 444 through the torque-transmitting mechanism 456. The planet carrier assembly member 436 is selectively connectible with the planet carrier assembly member 446 through the torque-transmitting mechanism 458. The ring gear member 444 is selectively connectible with the transmission housing 62 through the torque-transmitting mechanism 460.

As shown in the truth table of FIG. 10, the torque-transmitting mechanisms are engaged in combinations of four in the sequence shown in the truth table. Also shown in the truth table is a numerical value for the seven forward speed ratios and a reverse speed ratio that are possible with the planetary gear arrangement 418 when the ring gear/sun gear tooth ratios of the planetary gearsets 420, 430, and 440 are as shown in FIG. 10 as R1/S1, R2/S2, and R3/S3, respectively. The chart in FIG. 10 provides the numerical values for the ratio steps between adjacent forward speed ratios as well as between the reverse and first forward speed ratio that are present when the numerical values of the speed ratios are as given in the truth table. Also given in FIG. 10 is the numerical value of the overall ratio spread of forward speed ratios.

The reverse speed ratio is established with the engagement of the torque-transmitting mechanisms 450, 454, 458, and 460. During the reverse speed ratio, the ring gear member 434 and therefore output shaft 19 are rotated at a speed determined by the speed of the sun gear member 432 and the ring gear/sun gear tooth ratio of the planetary gearset 430. The numerical value of the reverse speed ratio is determined by the ring gear/sun gear tooth ratio of the planetary gearset 430.

The first forward speed ratio is established with the engagement of the torque-transmitting mechanisms 450, 456, 458, and 460. During the first forward speed ratio, the ring gear member 424 and sun gear member 432 are rotated at a speed determined by the speed of the sun gear member 422 and the ring gear/sun gear tooth ratio of the planetary gearset 420. The ring gear member 434 and therefore output shaft 19 are rotated at a speed determined by the speed of the sun gear member 432 and the ring gear/sun gear tooth ratio of the planetary gearset 430. The numerical value of the first forward speed ratio is determined by the ring gear/sun gear tooth ratios of the planetary gearsets 420 and 430.

The second forward speed ratio is established with the engagement of the torque-transmitting mechanisms 450, 454, 456, and 458. During the second forward speed ratio, the planet carrier assembly member 446 and planet carrier assembly member 436 are rotated at a speed determined by the speed of the ring gear member 444 and the ring gear/sun gear tooth ratio of the planetary gearset 440. The ring gear member 434 and therefore output shaft 19 are rotated at a speed determined by the speed of the sun gear member 432, the speed of the planet carrier assembly member 436, and the speed of the ring gear/sun gear tooth ratio of the planetary gearset 430. The numerical value of the second forward speed ratio is determined by the ring gear/sun gear tooth ratios of the planetary gearsets 430 and 440.

The third forward speed ratio is established with the engagement of the torque-transmitting mechanisms 450, 452, 456, and 458. During the third forward speed ratio, the ring gear member 444 and planet carrier assembly member 426 are rotated at a speed determined by the speed of the planet carrier assembly member 446 and the ring gear/sun gear tooth ratio of the planetary gearset 440. The ring gear member 424 and sun gear member 432 are rotated at a speed determined by the speed of the sun gear member 422, the speed of the planet carrier assembly member 426, and the ring gear/sun gear tooth ratio of the planetary gearset 420. The ring gear member 434 and therefore output shaft 19 are rotated at a speed determined by the speed of the planet carrier assembly member 436, the speed of the sun gear member 432, and the ring gear/sun gear tooth ratio of the planetary gearset 430. The numerical value of the third forward speed ratio is determined by the ring gear/sun gear tooth ratios of all three planetary gearsets 420, 430, and 440.

The fourth forward speed ratio is established with the engagement of the torque-transmitting mechanisms 452, 454, 456, and 458. During the fourth forward speed ratio, the ring gear member 444 and sun gear member 432 are rotated at a speed determined by the speed of the planet carrier assembly member 446 and the ring gear/sun gear tooth ratio of the planetary gearset 440. The ring gear member 434 and therefore output shaft 19 are rotated at a speed determined by the speed of the planet carrier assembly member 436, the speed of the sun gear member 432, and the ring gear/sun gear tooth ratio of the planetary gearset 430. The numerical value of the fourth forward speed ratio is determined by the ring gear/sun gear tooth ratios of the planetary gearsets 430 and 440.

The fifth forward speed ratio is established with the engagement of the torque-transmitting mechanisms 450, 452, 454, and 456. During the fifth forward speed ratio, the planetary gearset 430 is in a 1:1 condition wherein the input shaft 17 and the output shaft 19 rotate in unison. Therefore the numerical value of the fifth forward speed ratio is one.

The sixth forward speed ratio is established with the engagement of the torque-transmitting mechanisms 452, 454, 456, and 460. During the sixth forward speed ratio, the ring gear member 434 and therefore output shaft 19 are rotated at a speed determined by the speed of the planet carrier assembly member 436 and the ring gear/sun gear tooth ratio of the planetary gearset 430. The numerical value of the sixth forward speed ratio is determined by the ring gear/sun gear tooth ratio of the planetary gearset 430.

The seventh forward speed ratio is established with the engagement of the torque-transmitting mechanisms 450, 452, 456, and 460. During the seventh forward speed ratio, the ring gear member 424 and sun gear member 432 are rotated at a speed determined by the speed of the sun gear member 422 and the ring gear/sun gear tooth ratio of the planetary gearset 420. The ring gear member 434 and therefore output shaft 19 are rotated at a speed determined by the speed of the planet carrier assembly member 436, the speed of the sun gear member 432, and the ring gear/sun gear tooth ratio of the planetary gearset 430. The numerical value of the seventh forward speed ratio is determined by the ring gear/sun gear tooth ratios of the planetary gearsets 420 and 430.

Figures 11, 12:
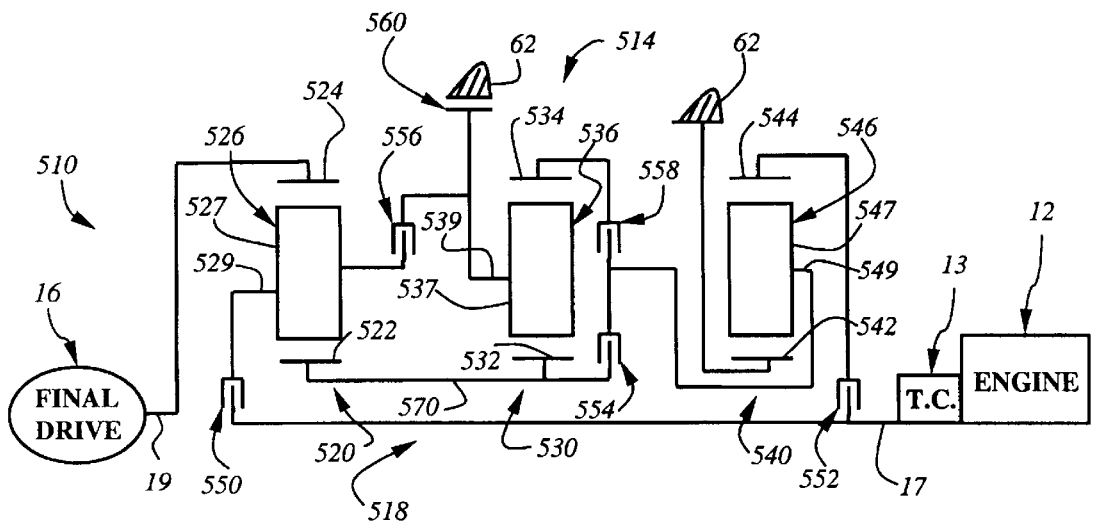
FIG. 11 is a schematic representation of a powertrain incorporating another family member of the present invention.
FIG. 12 is a truth table and chart describing some of the operating characteristics and numerical values that can be utilized with the family member shown in FIG. 11.

A powertrain 510, shown in FIG. 11, includes the engine 12, the torque converter 13, a planetary transmission 514, and the final drive mechanism 16. The planetary transmission 514 includes the input shaft 17, a planetary gear arrangement 518, and the output shaft 19. The planetary gear arrangement 518 includes three planetary gearsets 520, 530, and 540, and six torque-transmitting mechanisms 550, 552, 554, 556, 558, and 560. The torque-transmitting mechanism 560 is a stationary type torque-transmitting mechanism or brake, while the remaining torque-transmitting mechanisms are of the rotating type torque-transmitting mechanisms.

The planetary gearset 520 includes a sun gear member 522, a ring gear member 524, and a planet carrier assembly member 526. The planet carrier assembly member 526 includes a plurality of pinion gears 527 rotatably mounted on a planet carrier member 529 and disposed in meshing relationship with both the sun gear member 522 and the ring gear member 524.

The planetary gearset 530 includes a sun gear member 532, a ring gear member 534, and a planet carrier assembly member 536. The planet carrier assembly member 536 includes a plurality of pinion gears 537 rotatably mounted on a planet carrier member 539 and disposed in meshing relationship with both the sun gear member 532 and the ring gear member 534.

The planetary gearset 540 includes a sun gear member 542, a ring gear member 544, and a planet carrier assembly member 546. The planet carrier assembly member 546 includes a plurality of pinion gears 547 rotatably mounted on a planet carrier member 549 and disposed in meshing relationship with both the sun gear member 542 and the ring gear member 544.

The sun gear member 522 and the sun gear member 532 are continuously interconnected by an interconnecting member 570, which is selectively connectible with the planet carrier assembly member 546 through the torque-transmitting mechanism 554. The sun gear member 542 is continuously connected with the transmission housing 62. The output shaft 19 is continuously connected with the ring gear member 524.

The input shaft 17 is selectively connectible with the planet carrier assembly member 526 through the torque-transmitting mechanism 550 and selectively connectible with the ring gear member 544 through the torque-transmitting mechanism 552. The planet carrier assembly member 526 is selectively connectible with the planet carrier assembly member 536 through the torque-transmitting mechanism 556. The planet carrier assembly member 536 is selectively connectible with the transmission housing 62 through the torque-transmitting mechanism 560. The ring gear member 534 is selectively connectible with the planet carrier assembly member 546 through the torque-transmitting mechanism 558.

The truth table in FIG. 12 describes the engagement combinations and sequences for the torque-transmitting mechanisms in order to provide seven forward speed ratios and one reverse speed ratio between the input shaft 17 and the output shaft 19 through the planetary gear arrangement 518. Also given in the truth table is a sample of the numerical value of the speed ratios that are available with the planetary gear arrangement 518 when the ring gear/sun gear tooth ratios of the planetary gearsets 520, 530, and 540 are selected as given in FIG. 12 as R1/S1, R2/S2, and R3/S3, respectively. Also shown in FIG. 12 is a chart providing the numerical values of the ratio steps between adjacent forward speed ratios as well as between the reverse and first forward speed ratio when the numerical values of the ratios given in the truth table are utilized. Also given in FIG. 12 is the numerical value for the overall ratio spread of the forward speed ratios.

The reverse speed ratio is established with the engagement of the torque-transmitting mechanisms 552, 554, 556, and 560. During the reverse speed ratio, the planet carrier assembly member 546 and sun gear member 522 are rotated at a speed determined by the speed of the ring gear member 544 and the ring gear/sun gear tooth ratio of the planetary gearset 540. The ring gear member 524 and therefore output shaft 19 are rotated at a speed determined by the speed of the sun gear member 522 and the ring gear/sun gear tooth ratio of the planetary gearset 520. The numerical value of the reverse speed ratio is determined by the ring gear/sun gear tooth ratios of the planetary gearsets 520 and 540.

The first forward speed ratio is established with the engagement of the torque-transmitting mechanisms 552, 556, 558, and 560. During the first forward speed ratio, the planet carrier assembly member 546 and ring gear member 534 are rotated at a speed determined by the speed of the ring gear member 544 and the ring gear/sun gear tooth ratio of the planetary gearset 540. The sun gear members 532 and 522 are rotated at a speed determined by the speed of the ring gear member 534 and ring gear/sun gear tooth ratio of the planetary gearset 530. The ring gear member 524 and therefore output shaft 19 are rotated at a speed determined by the speed of the sun gear member 522 and the ring gear/sun gear tooth ratio of the planetary gearset 520. The numerical value of the first forward speed ratio is determined by the ring gear/sun gear tooth ratios of all three planetary gearsets 520, 530, and 540.

The second forward speed ratio is established with the engagement of the torque-transmitting mechanisms 552, 554, 556, and 558. During the second forward speed ratio, the planet carrier assembly member 546, planetary gearset 530, and planetary gearset 520 rotate in unison at a speed determined by the speed of input shaft 17, the speed of the ring gear member 544, and the ring gear/sun gear tooth ratio of the planetary gearset 540. The numerical value of the second forward speed ratio is determined by the ring gear/sun gear tooth ratio of the planetary gearset 540.

The third forward speed ratio is established with the engagement of the torque-transmitting mechanisms 550, 552, 556, and 558. During the third forward speed ratio, the planet carrier assembly member 546 and ring gear member 534 are rotated at a speed determined by the speed of the ring gear member 544 and the ring gear/sun gear tooth ratio of the planetary gearset 540. The sun gear members 532 and 522 are rotated at a speed determined by the speed of the ring gear member 534, the speed of the planet carrier assembly member 536, and the ring gear/sun gear tooth ratio of the planetary gearset 530. The ring gear member 524 and therefore output shaft 19 are rotated at a speed determined by the speed of the planet carrier assembly member 526, the speed sun gear member 522, and the ring gear/sun gear tooth ratio of the planetary gearset 520. The numerical value of the third forward speed ratio is determined by the ring gear/sun gear tooth ratios of all three planetary gearsets 520, 530, and 540.

The fourth forward speed ratio is established with the engagement of the torque-transmitting mechanisms 550, 554, 556, and 558. During the fourth forward speed ratio, the planetary gearset 520 rotates as a single unit such that the input shaft 17 and the output shaft 19 rotate as a single unit. Therefore the numerical value of the fourth forward speed ratio is one.

The fifth forward speed ratio is established with the engagement of the torque-transmitting mechanisms 550, 552, 554, and 558. During the fifth forward speed ratio, the planet carrier assembly member 546 and sun gear member 522 are rotated at a speed determined by the speed of the ring gear member 544 and the ring gear/sun gear tooth ratio of the planetary gearset 540. The ring gear member 524 and therefore output shaft 19 are rotated at a speed determined by the speed of the planet carrier assembly member 526, the speed of the sun gear member 522, and the ring gear/sun gear tooth ratio of the planetary gearset 520. The numerical value of the fifth forward speed ratio is determined by the ring gear/sun gear tooth ratios of the planetary gearsets 520 and 540.

The sixth forward speed ratio is established with the engagement of the torque-transmitting mechanisms 550, 554, 558, and 560. During the sixth forward speed ratio, the speed of the ring gear member 524 and therefore output shaft 19 are determined by the speed of the planet carrier assembly member 526 and the ring gear/sun gear tooth ratio of the planetary gearset 520. The numerical value of the sixth forward speed ratio is determined by the ring gear/sun gear tooth ratio of the planetary gearset 520.

The seventh forward speed ratio is established with the engagement of the torque-transmitting mechanisms 550, 552, 558, and 560. During the seventh forward speed ratio, the planet carrier assembly member 546 and ring gear member 534 are rotated at a speed determined by the speed of the ring gear member 544 and the ring gear/sun gear tooth ratio of the planetary gearset 540. The sun gear members 532 and 522 are rotated at a speed determined by the speed of the ring gear member 534 and the ring gear/sun gear tooth ratio of the planetary gearset 530. The output shaft 19 and ring gear member 524 are rotated at a speed determined by the speed of the planet carrier assembly member 526, the speed of the sun gear member 522, and the ring gear/sun gear tooth ratio of the planetary gearset 520. The numerical value of the seventh forward speed ratio is determined by the ring gear/sun gear tooth ratios of all three planetary gearsets 520, 530, and 540.

Figures 13, 14:
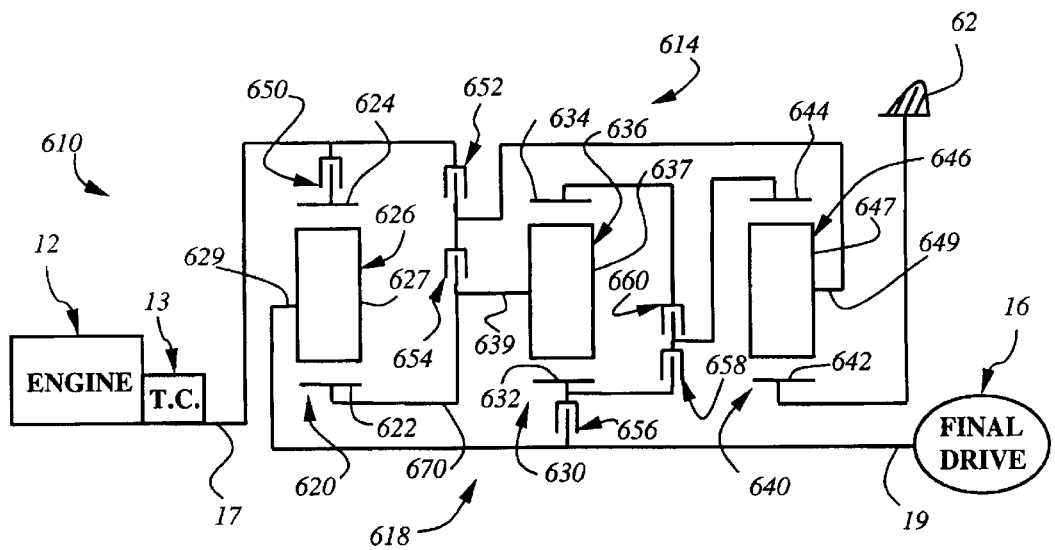
FIG. 13 is a schematic representation of a powertrain incorporating another family member of the present invention.
FIG. 14 is a truth table and chart describing some of the operating characteristics and numerical values that can be utilized with the family member shown in FIG. 13.

A powertrain 610, shown in FIG. 13, includes the engine 12, the torque converter 13, a planetary transmission 614, and the final drive mechanism 16. The planetary transmission 614 includes the input shaft 17, a planetary gear arrangement 618, and the output shaft 19. The planetary gear arrangement 618 includes three planetary gearsets 620, 630, and 640, and six torque-transmitting mechanisms 650, 652, 654, 656, 658, and 660. All of the torque-transmitting mechanisms are of the rotating type torque-transmitting mechanisms.

The planetary gearset 620 includes a sun gear member 622, a ring gear member 624, and a planet carrier assembly member 626. The planet carrier assembly member 626 includes a plurality of pinion gears 627 rotatably mounted on a planet carrier member 629 and disposed in meshing relationship with both the sun gear member 622 and the ring gear member 624.

The planetary gearset 630 includes a sun gear member 632, a ring gear member 634, and a planet carrier assembly member 636. The planet carrier assembly member 636 includes a plurality of pinion gears 637 rotatably mounted on a planet carrier member 639 and disposed in meshing relationship with both the sun gear member 632 and the ring gear member 634.

The planetary gearset 640 includes a sun gear member 642, a ring gear member 644, and a planet carrier assembly member 646. The planet carrier assembly member 646 includes a plurality of pinion gears 647 rotatably mounted on a planet carrier member 649 and disposed in meshing relationship with both the sun gear member 642 and the ring gear member 644.

The sun gear member 622 and planet carrier assembly member 636 are continuously interconnected through an interconnecting member 670, which is selectively connectible with the planet carrier assembly member 646 through the torque-transmitting mechanism 654. The sun gear member 642 is continuously connected with the transmission housing 62. The output shaft 19 is continuously connected with the planet carrier assembly member 626.

The input shaft 17 is selectively connectible with the ring gear member 624 through the torque-transmitting mechanism 650 and selectively connectible with the planet carrier assembly member 646 through the torque-transmitting mechanism 652. The sun gear member 632 is selectively connectible with the output shaft 19 through the torque-transmitting mechanism 656 and selectively connectible with the ring gear member 644 through the torque-transmitting mechanism 658. The ring gear members 634 and 644 are selectively interconnectible through the torque-transmitting mechanism 660.

The truth table of FIG. 14 describes the combination of engagements as well as the sequence of engagements for the torque-transmitting mechanisms in order to establish seven forward speed ratios and a reverse speed ratio between the input shaft 17 and the output shaft 19 through the planetary gear arrangement 618. Also given in the truth table is an example of the numerical values for the speed ratios. These numerical values are established utilizing the ring gear/sun gear tooth ratios of the planetary gearsets 620, 630, and 640 as given in FIG. 14 as R1/S1, R2/S2, and R3/S3, respectively. Further information given in FIG. 14 is shown in the chart in which the numerical values of the ratio steps between adjacent forward speed ratios as well as between the reverse and first forward speed ratio are provided. Also the overall ratio spread of the forward speed ratios is provided in the chart.

Those skilled in the art will recognize that, with the combination of engagements for the reverse speed ratio, the numerical value of the reverse speed ratio is determined by the ring gear/sun gear tooth ratios of the planetary gearsets 630 and 640. The numerical values, for first forward speed ratio and the fifth forward speed ratio, are determined by the ring gear/sun gear tooth ratios of the planetary gearsets 620, 630, and 640. The numerical value of the second forward speed ratio is determined by the ring gear/sun gear tooth ratio of the planetary gearset 620. The numerical values of the third and sixth forward speed ratios are determined by the ring gear/sun gear tooth ratios of the planetary gearsets 620 and 640. The fourth forward speed ratio has a numerical value of one. The seventh forward speed ratio has a numerical value determined by the ring gear/sun gear tooth ratio of the planetary gearset 640.

Figures 15, 16:
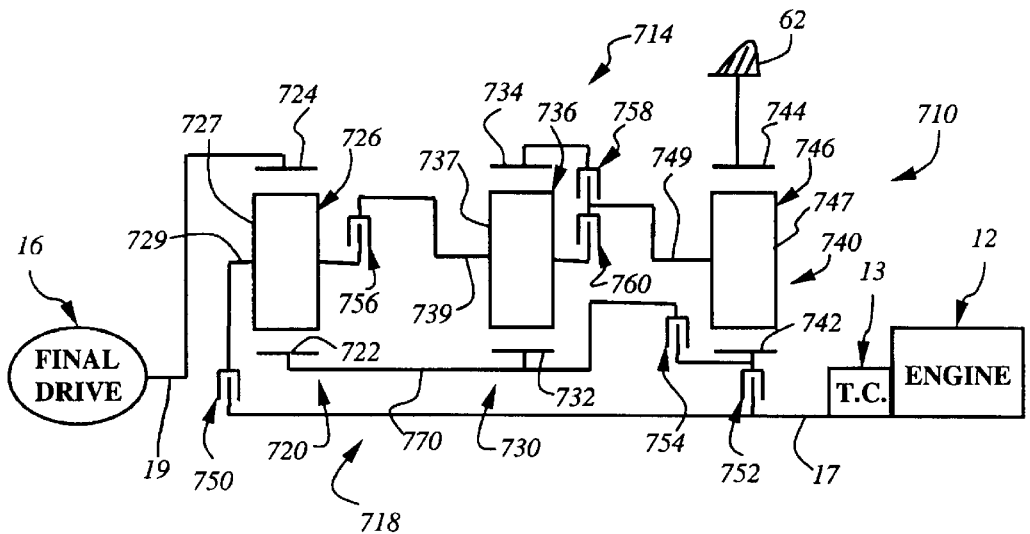
FIG. 15 is a schematic representation of a powertrain incorporating another family member of the present invention.
FIG. 16 is a truth table and chart describing some of the operating characteristics and numerical values that can be utilized with the family member shown in FIG. 15.

A powertrain 710, shown in FIG. 15, includes the engine 12, the torque converter 13, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740, and six torque-transmitting mechanisms 750, 752, 754, 756, 758, and 760. All of the torque-transmitting mechanisms are of the rotating type torque-transmitting mechanisms.

The planetary gearset 620 includes a sun gear member 722, a ring gear member 724, and a planet carrier assembly member 726. The planet carrier assembly member 726 includes a plurality of pinion gears 727 rotatably mounted on a planet carrier member 729 and disposed in meshing relationship with both the sun gear member 722 and the ring gear member 724.

The planetary gearset 730 includes a sun gear member 732, a ring gear member 734, and a planet carrier assembly member 736. The planet carrier assembly member 736 includes a plurality of pinion gears 737 rotatably mounted on a planet carrier member 739 and disposed in meshing relationship with both the sun gear member 732 and the ring gear member 734.

The planetary gearset 740 includes a sun gear member 742, a ring gear member 744, and a planet carrier assembly member 746. The planet carrier assembly member 746 includes a plurality of pinion gears 747 rotatably mounted on a planet carrier member 749 and disposed in meshing relationship with both the sun gear member 742 and the ring gear member 744.

The sun gear member 722 and sun gear member 732 are continuously interconnected by an interconnecting member 770, which is selectively connectible with the sun gear member 742 through the torque-transmitting mechanism 754. The ring gear member 744 is continuously connected with the transmission housing 62. The ring gear member 724 is continuously connected with the output shaft 19.

The input shaft 17 is selectively connectible with the planet carrier assembly member 726 through the torque-transmitting mechanism 750 and selectively connectible with the sun gear member 742 through the torque-transmitting mechanism 752. The planet carrier assembly member 736 is selectively connectible with the planet carrier assembly member 726 through the torque-transmitting mechanism 756 and selectively connectible with the planet carrier assembly member 746 through the torque-transmitting mechanism 760. The ring gear member 734 is selectively connectible with the planet carrier assembly member 746 through the torque-transmitting mechanism 758.

The truth table of FIG. 16 describes the combination of engagements as well the sequence of engagements for the torque-transmitting mechanisms in order to establish seven forward speed ratios and one reverse speed ratio between the input shaft 17 and the output shaft 19 through the planetary gear arrangement 718. Also given in the truth table is a numerical value for each of the speed ratios. The numerical values are determined utilizing the ring gear/sun gear tooth ratios of the planetary gearsets 720, 730, and 740, as provided in FIG. 16 by the ratios R1/S1, R2/S2, and R3/S3, respectively. The chart in FIG. 16 shows the numerical values for the ratio steps between adjacent forward speed ratios as well as between the reverse and first forward speed ratio when the numerical values given in the truth table are employed. Also given in the chart of FIG. 16 is the overall ratio spread of the forward speed ratios.

Those skilled in the art will recognize that the reverse speed ratio has a numerical value determined by the ring gear/sun gear tooth ratios of the planetary gearsets 720 and 740. The first forward speed ratio has a numerical value determined by the ring gear/sun gear tooth ratio of the planetary gearset 740. The second, third, and fourth forward speed ratios have numerical values determined by the ring gear/sun gear tooth ratios of all three planetary gearsets 720, 730, and 740. The fifth forward speed ratio has a numerical value of one. The sixth forward speed ratio has a numerical value determined by the ring gear/sun gear tooth ratios of the planetary gearsets 720 and 740. The seventh forward speed ratio has a numerical value determined by the ring gear/sun gear tooth ratio of the planetary gearset 720.

Figures 17, 18:
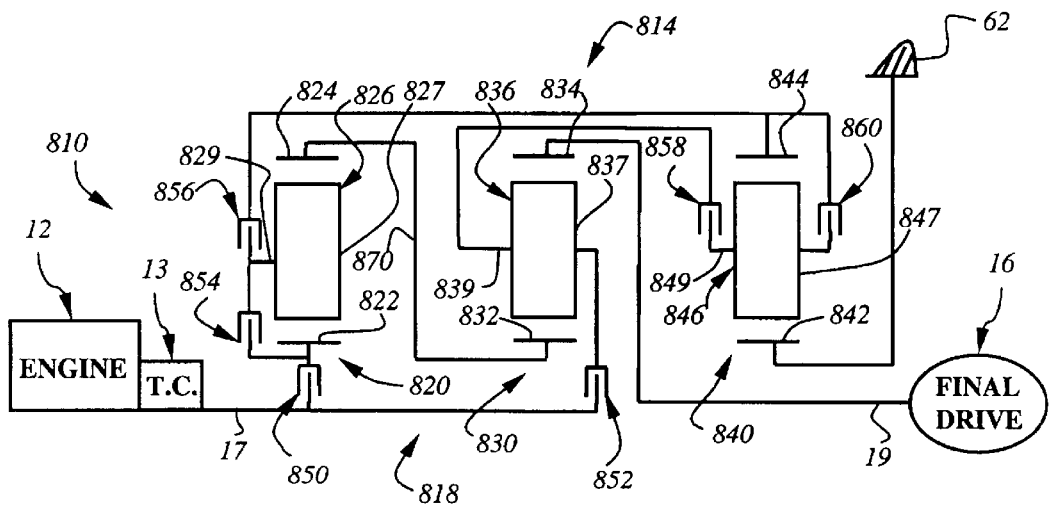
FIG. 17 is a schematic representation of a powertrain incorporating another family member of the present invention.
FIG. 18 is a truth table and chart describing some of the operating characteristics and numerical values that can be utilized with the family member shown in FIG. 17.

A powertrain 810, shown in FIG. 17, includes the engine 12, the torque converter 13, a planetary transmission 814, and the final drive mechanism 16. The planetary transmission 814 includes the input shaft 17, a planetary gear arrangement 818, and the output shaft 19. The planetary gear arrangement 818 includes three planetary gearsets 820, 830, and 840, and six torque-transmitting mechanisms 850, 852, 854, 856, 858, and 860. All of the torque-transmitting mechanisms are of the rotating type torque-transmitting mechanisms.

The planetary gearset 820 includes a sun gear member 822, a ring gear member 824, and a planet carrier assembly member 826. The planet carrier assembly member 826 includes a plurality of pinion gears 827 rotatably mounted on a planet carrier member 829 and disposed in meshing relationship with both the sun gear member 822 and the ring gear member 824.

The planetary gearset 830 includes a sun gear member 832, a ring gear member 834, and a planet carrier assembly member 836. The planet carrier assembly member 836 includes a plurality of pinion gears 837 rotatably mounted on a planet carrier member 839 and disposed in meshing relationship with both the sun gear member 832 and the ring gear member 834.

The planetary gearset 840 includes a sun gear member 842, a ring gear member 844, and a planet carrier assembly member 886. The planet carrier assembly member 846 includes a plurality of pinion gears 847 rotatably mounted on a planet carrier member 849 and disposed in meshing relationship with both the sun gear member 842 and the ring gear member 844.

The ring gear member 824 and sun gear member 832 are continuously interconnected by an interconnecting member 870. The sun gear member 842 is continuously connected with the transmission housing 62. The ring gear member 834 is continuously connected with the output shaft 19.

The input shaft 17 is selectively connectible with the sun gear member 822 through the torque-transmitting mechanism 850 and selectively connectible with the planet carrier assembly member 836 through the torque-transmitting mechanism 852. The planet carrier assembly member 826 is selectively connectible with the sun gear member 822 through the torque-transmitting mechanism 854 and selectively connectible with the ring gear member 844 through the torque-transmitting mechanism 856. The planet carrier assembly member 846 is selectively connectible with the ring gear member 844 through the torque-transmitting mechanism 860 and selectively connectible with the planet carrier assembly member 836 through the torque-transmitting mechanism 858.

The truth table of FIG. 18 describes the sequence of engagements as well as the combinations of engagement for the torque-transmitting mechanisms in order to establish seven forward speed ratios and a reverse speed ratio through the planetary gear arrangement 818 between the input shaft 17 and the output shaft 19. The truth table also provides a numerical value for each of the speed ratios, which can be obtained with the planetary gear arrangement 818 when the ring gear/sun gear tooth ratios of the planetary gearsets 820, 830, and 840 are as given in R1/S1, R2/S2, and R3/S3, respectively. The chart in FIG. 18 describes the numerical value for the ratio steps between adjacent forward speed ratios as well as between the reverse and first forward speed ratio. The numerical value of the overall ratio spread in the forward speed ratios is also given the in chart of FIG. 18.

On reviewing the combinations of engagements in the truth table of FIG. 18, those skilled in the art will recognize that the reverse speed ratio has a numerical determined by the ring gear/sun gear tooth ratio of the planetary gearset 830. The first forward speed ratio and the seventh forward speed ratio have numerical values determined by the ring gear/sun gear tooth ratios of the planetary gearsets 820 and 830. The second forward speed ratio and the fourth forward speed ratio have numerical values determined by the ring gear/sun gear tooth ratios of the planetary gearsets 830 and 840. The third forward speed ratio has a numerical value determined by the ring gear/sun gear tooth ratios of all three planetary gearsets 820, 830, and 840. The fifth forward speed ratio has a numerical value of one.

Figures 19, 20:
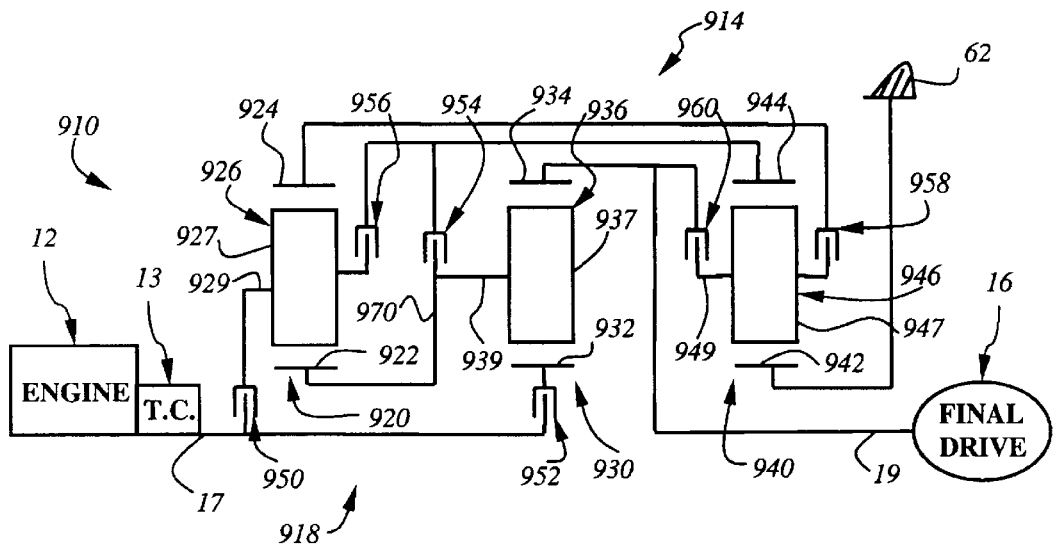
FIG. 19 is a schematic representation of a powertrain incorporating another family member of the present invention.
FIG. 20 is a truth table and chart describing some of the operating characteristics and numerical values that can be utilized with the family member shown in FIG. 19.

A powertrain 910, shown in FIG. 19, includes the engine 12, the torque converter 13, a planetary transmission 914, and the final drive mechanism 16. The planetary transmission 914 includes the input shaft 17, a planetary gear arrangement 918, and the output shaft 19. The planetary gear arrangement 918 includes three planetary gearsets 920, 930, and 940, and six torque-transmitting mechanisms 950, 952, 954, 956, 958, and 960. All of the torque-transmitting mechanisms are of the rotating type torque-transmitting mechanisms.

The planetary gearset 920 includes a sun gear member 922, a ring gear member 924, and a planet carrier assembly member 926. The planet carrier assembly member 926 includes a plurality of pinion gears 927 rotatably mounted on a planet carrier member 929 and disposed in meshing relationship with both the sun gear member 922 and the ring gear member 924.

The planetary gearset 930 includes a sun gear member 932, a ring gear member 934, and a planet carrier assembly member 936. The planet carrier assembly member 936 includes a plurality of pinion gears 937 rotatably mounted on a planet carrier member 939 and disposed in meshing relationship with both the sun gear member 932 and the ring gear member 934.

The planetary gearset 940 includes a sun gear member 942, a ring gear member 944, and a planet carrier assembly member 946. The planet carrier assembly member 946 includes a plurality of pinion gears 947 rotatably mounted on a planet carrier member 949 and disposed in meshing relationship with both the sun gear member 942 and the ring gear member 944.

The sun gear member 922 and planet carrier assembly member 936 are continuously interconnected by an interconnecting member 970, which is selectively connectible with the ring gear member 944 through the torque-transmitting mechanism 954. The sun gear member 942 is continuously connected with the transmission housing 62. The output shaft 19 is continuously connected with the ring gear member 934 and selectively connectible with the planet carrier assembly member 946 through the torque-transmitting mechanism 960.

The input shaft 17 is selectively connectible with the planet carrier assembly member 926 through the torque-transmitting mechanism 950 and selectively connectible with the sun gear member 932 through the torque-transmitting mechanism 952. The planet carrier assembly member 926 is selectively connectible with the ring gear member 944 through the torque-transmitting mechanism 956. The planet carrier assembly member 946 is selectively connectible with the ring gear member 924 through the torque-transmitting mechanism 958.

The truth table of FIG. 20 describes the engagement combinations and sequence of engagements in order to establish seven forward speed ratios and one reverse speed ratio in the planetary gear arrangement 918 between the input shaft 17 and the output shaft 19. Also given in the truth table is a numerical example of each of these speed ratios. The numerical examples are established utilizing the ring gear/sun gear tooth ratios R1/S1, R2/S2, and R3/S3, which represent the ring gear/sun gear tooth ratios of the planetary gearsets 920, 930, and 940, respectively. The chart in FIG. 20 provides a numerical example of the ratio steps between adjacent forward speed ratios as well as between the reverse and first forward speed ratio. The overall ratio spread of the forward speed ratios is also given the chart of FIG. 20. The numbers in the chart of FIG. 20 are the values that are obtained when the ratio numbers given in the truth table are employed.

Those skilled in the art, upon reviewing the combinations of engagements in the truth table, will recognize that the numerical of the reverse speed ratio is determined by the ring gear/sun gear tooth ratio of the planetary gearset 930. The numerical values of the first forward speed ratio, the sixth forward speed ratio, and the seventh forward speed ratio are determined by the ring gear/sun gear tooth ratios of all three planetary gearsets 920, 930, and 940. The second forward speed ratio has a numerical value determined by the ring gear/sun gear tooth ratios of the planetary gearsets 930 and 940. The third forward speed ratio has a numerical value determined by the ring gear/sun gear tooth ratio of the planetary gearset 940. The fourth forward speed ratio has a numerical value determined by the ring gear/sun gear tooth ratios of the planetary gearsets 920 and 940. The fifth forward speed ratio has a numerical value of one.

Figures 21, 22:
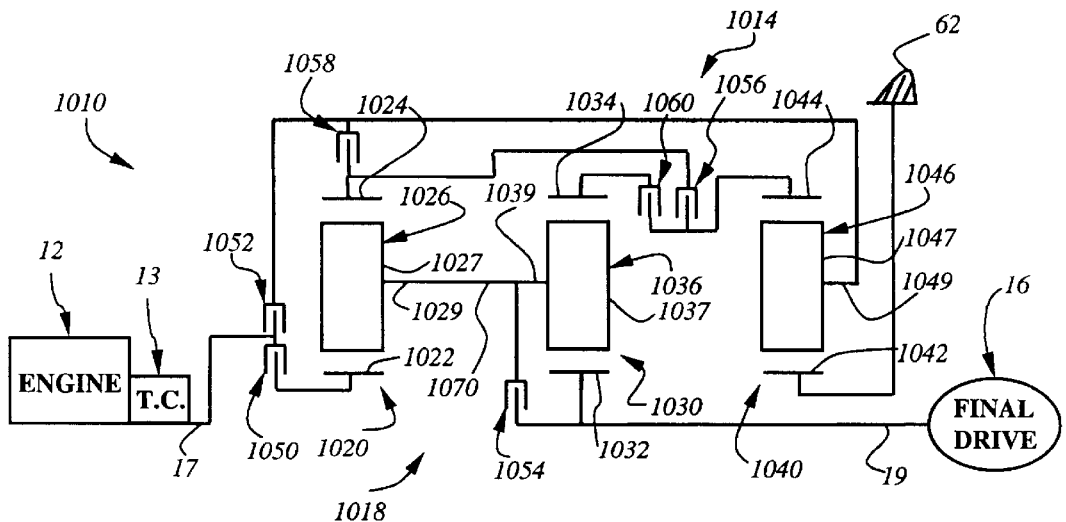
FIG. 21 is a schematic representation of a powertrain incorporating another family member of the present invention.
FIG. 22 is a truth table and chart describing some of the operating characteristics and numerical values that can be utilized with the family member shown in FIG. 21.

A powertrain 1010, shown in FIG. 21, includes the engine 12, the torque converter 13, a planetary transmission 1014, and the final drive mechanism 16. The planetary transmission 1014 includes the input shaft 17, a planetary gear arrangement 1018, and the output shaft 19. The planetary gear arrangement 1018 includes three planetary gearsets 1020, 1030, and 1040, and six torque-transmitting mechanisms 1050, 1052, 1054, 1056, 1058, and 1060. All of the torque-transmitting mechanisms are of the rotating type torque-transmitting mechanisms.

The planetary gearset 1020 includes a sun gear member 1022, a ring gear member 1024, and a planet carrier assembly member 1026. The planet carrier assembly member 1026 includes a plurality of pinion gears 1027 rotatably mounted on a planet carrier member 1029 and disposed in meshing relationship with both the sun gear member 1022 and the ring gear member 1024.

The planetary gearset 1030 includes a sun gear member 1032, a ring gear member 1034, and a planet carrier assembly member 1036. The planet carrier assembly member 1036 includes a plurality of pinion gears 1037 rotatably mounted on a planet carrier member 1039 and disposed in meshing relationship with both the sun gear member 1032 and the ring gear member 1034.

The planetary gearset 1040 includes a sun gear member 1042, a ring gear member 1044, and a planet carrier assembly member 1046. The planet carrier assembly member 1046 includes a plurality of pinion gears 1047 rotatably mounted on a planet carrier member 1049 and disposed in meshing relationship with both the sun gear member 1042 and the ring gear member 1044.

The planet carrier assembly member 1026 and planet carrier assembly member 1036 are continuously interconnected by an interconnecting member 1070 which is selectively connectible with the output shaft 19 through the torque-transmitting mechanism 1054. The sun gear member 1042 is continuously connected with the transmission housing 62. The output shaft 19 is continuously connected with the sun gear member 1032.

The input shaft 17 is selectively connectible with the sun gear member 1022 through the torque-transmitting mechanism 1050 and selectively connectible with the planet carrier assembly member 1046 through the torque-transmitting mechanism 1052. The ring gear member 1024 is selectively connectible with the ring gear member 1044 through the torque-transmitting mechanism 1056 and selectively connectible with the planet carrier assembly member 1046 through the torque-transmitting mechanism 1058. The ring gear members 1034 and 1044 are selectively interconnectible with the torque-transmitting mechanism 1060.

The truth table of FIG. 22 describes the engagement sequence and combinations for the torque-transmitting mechanisms in order to provide seven forward speed ratios and one reverse speed ratio between the input shaft 17 and the output shaft 19 through the planetary gear arrangement 1018. Also given in the truth table is an example of numerical values for the speed ratios, which can be obtained utilizing the ring gear/sun gear tooth ratios given as R1/S1, R2/S2, and R3/S3, which represent the ring gear/sun gear tooth ratios for the planetary gearsets 1020, 1030, and 1040, respectively. Further in FIG. 22 is a chart, which provides the numerical value for the ratio steps between adjacent forward speed ratios as well as between the reverse and first forward speed ratio. Also given in the chart is the overall ratio spread for the forward speed ratios.

Upon reviewing the engagement combinations given in the truth table, those skilled in the art will recognize that the reverse speed ratio has a numerical value determined by the ring gear/sun gear tooth ratios of the planetary gearsets 1030 and 1040. The first forward speed ratio has a numerical value determined by the ring gear/sun gear tooth ratio of the planetary gearset 1020. The second and sixth forward speed ratios have numerical values determined by the ring gear/sun gear tooth ratios of the planetary gearsets 1020 and 1040. The third forward speed ratio has a numerical value determined by the ring gear/sun gear tooth ratios of the planetary gearsets 1020 and 1030. The fourth forward speed ratio has a numerical value of one. The fifth forward speed ratio has a numerical value determined by the ring gear/sun gear tooth ratios of all three planetary gearsets 1020, 1030, and 1040. The seventh forward speed ratio has a numerical value determined by the ring gear/sun gear tooth ratio of the planetary gearset 1040.

Figures 23, 24:
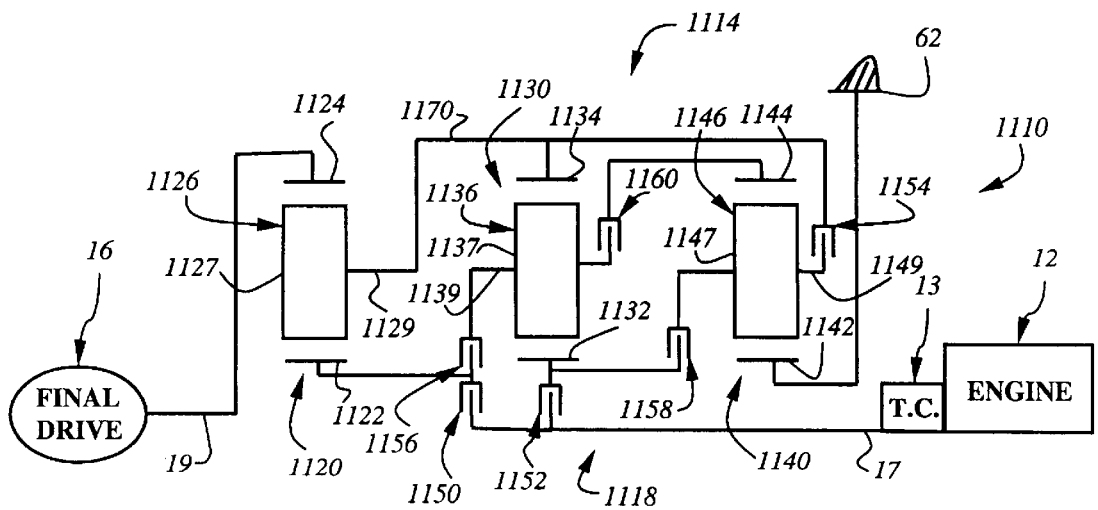
FIG. 23 is a schematic representation of a powertrain incorporating another family member of the present invention.
FIG. 24 is a truth table and chart describing some of the operating characteristics and numerical values that can be utilized with the family member shown in FIG. 23.

A powertrain 1110, shown in FIG. 23, includes the engine 12, the torque converter 13, a planetary transmission 11 14, and the final drive mechanism 16. The planetary transmission 1114 includes the input shaft 17, a planetary gear arrangement 1118, and the output shaft 19. The planetary gear arrangement 1118 includes three planetary gearsets 1120, 1130, and 1140, and six torque-transmitting mechanisms 1150, 1152, 1154, 1156, 1158, and 1160. All of the torque-transmitting mechanisms are of the rotating type torque-transmitting mechanisms.

The planetary gearset 1120 includes a sun gear member 1122, a ring gear member 1124, and a planet carrier assembly member 1126. The planet carrier assembly member 1126 includes a plurality of pinion gears 1127 rotatably mounted on a planet carrier member 1129 and disposed in meshing relationship with both the sun gear member 1122 and the ring gear member 1124.

The planetary gearset 1130 includes a sun gear member 1132, a ring gear member 1134, and a planet carrier assembly member 1136. The planet carrier assembly member 1136 includes a plurality of pinion gears 1137 rotatably mounted on a planet carrier member 1139 and disposed in meshing relationship with both the sun gear member 1132 and the ring gear member 1134.

The planetary gearset 1140 includes a sun gear member 1142, a ring gear member 1144, and a planet carrier assembly member 1146. The planet carrier assembly member 1146 includes a plurality of pinion gears 1147 rotatably mounted on a planet carrier member 1149 and disposed in meshing relationship with both the sun gear member 1142 and the ring gear member 1144.

The planet carrier assembly member 1126 is continuously interconnected with the ring gear member 1134 through an interconnecting member 1170 and selectively connectible with the planet carrier assembly member 1146 through the torque-transmitting mechanism 1154. The sun gear member 1142 is continuously connected with the transmission housing 62. The ring gear member 1124 is continuously connected with the output shaft 19.

The input shaft 17 is selectively connectible with the sun gear member 1122 through the torque-transmitting mechanism 1150 and selectively connectible with the sun gear member 1132 through the torque-transmitting mechanism 1152. The planet carrier assembly member 1136 is selectively connectible with the sun gear member 1122 through the torque-transmitting mechanism 1156 and selectively connectible with the ring gear member 1144 through the torque-transmitting mechanism 1160. The planet carrier assembly member 1146 and the sun gear member 1132 are selectively interconnectible by the torque-transmitting mechanism 1158.

The truth table shown in FIG. 24 provides a pictorial representation of the engagement combinations and sequence for the torque-transmitting mechanisms in order to establish seven forward speed ratios and, one reverse speed ratio between the input shaft 17 and the output shaft 19 through the planetary gear arrangement 1118. The truth table also provides an example of numerical values that can be obtained with the planetary gear arrangement 1118 when the ring gear/sun gear tooth ratios of the planetary gearsets 1120, 1130, and 1140 are as represented in FIG. 24 as R1/S1, R2/S2, and R3/S3, respectively. Further information given in FIG. 24 by way of a chart is the numerical values for the ratio steps between adjacent forward speed ratios as well as between the reverse and first forward speed ratio. The overall ratio spread of the forward speed ratios is also given in FIG. 24.

Those skilled in the art will recognize, upon reviewing the engagement combinations of the torque-transmitting mechanisms, that the reverse speed ratio has a numerical value determined by the ring gear/sun gear tooth ratio of the planetary gearset 1120. The first forward speed ratio, the second forward speed ratio, the fifth forward speed ratio, the sixth forward speed ratio, and the seventh forward speed ratio have numerical values determined by the ring gear/sun gear tooth ratios of all three planetary gearsets 1120, 1130, and 1140. The third forward speed ratio has a numerical value determined by the ring gear/sun gear tooth ratios of the planetary gearsets 1120 and 1140. The fourth forward speed ratio has a numerical value of one.

Figures 25, 26:
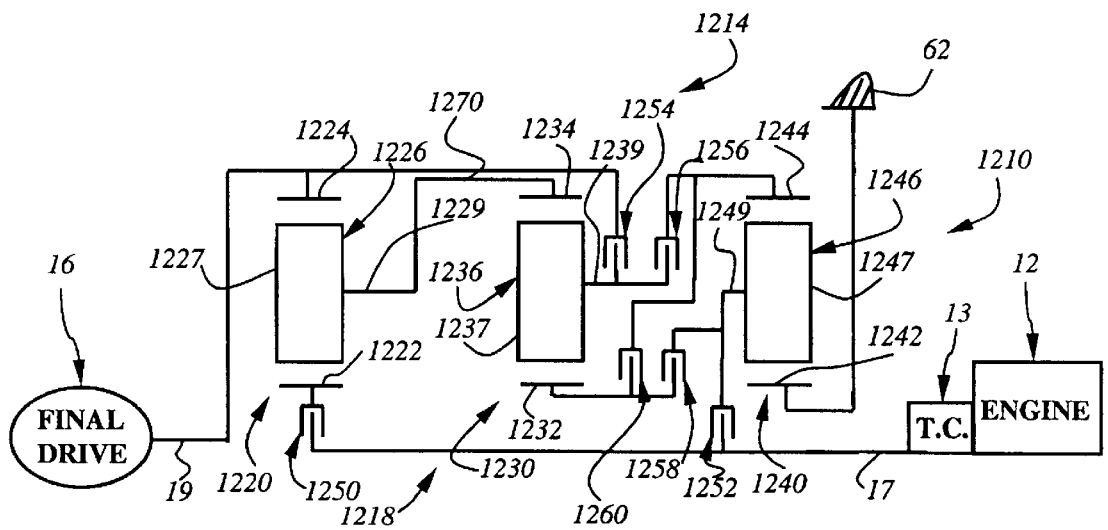
FIG. 25 is a schematic representation of a powertrain incorporating another family member of the present invention.
FIG. 26 is a truth table and chart describing some of the operating characteristics and numerical values that can be utilized with the family member shown in FIG. 25.

A powertrain 1210, shown in FIG. 25, includes the engine 12, the torque converter 13, a planetary transmission 1214, and the final drive mechanism 16. The planetary transmission 1214 includes the input shaft 17, a planetary gear arrangement 1218, and the output shaft 19. The planetary gear arrangement 1218 includes three planetary gearsets 1220, 1230, and 1240, and six torque-transmitting mechanisms 1250, 1252, 1254, 1256, 1258, and 1260. All of the torque-transmitting mechanisms are of the rotating type torque-transmitting mechanisms.

The planetary gearset 1220 includes a sun gear member 1222, a ring gear member 1224, and a planet carrier assembly member 1226. The planet carrier assembly member 1226 includes a plurality of pinion gears 1227 rotatably mounted on a planet carrier member 1229 and disposed in meshing relationship with both the sun gear member 1222 and the ring gear member 1224.

The planetary gearset 1230 includes a sun gear member 1232, a ring gear member 1234, and a planet carrier assembly member 1236. The planet carrier assembly member 1236 includes a plurality of pinion gears 1237 rotatably mounted on a planet carrier member 1239 and disposed in meshing relationship with both the sun gear member 1232 and the ring gear member 1234.

The planetary gearset 1240 includes a sun gear member 1242, a ring gear member 1244, and a planet carrier assembly member 1246. The planet carrier assembly member 1246 includes a plurality of pinion gears 1247 rotatably mounted on a planet carrier member 1249 and disposed in meshing relationship with both the sun gear member 1242 and the ring gear member 1244.

The planet carrier assembly member 1226 is continuously interconnected with the ring gear member 1234 through an interconnecting member 1270. The sun gear member 1242 is continuously connected with the transmission housing 62. The ring gear member 1224 is continuously connected with the output shaft 19, which is selectively connectible with the planet carrier assembly member 1236 through the torque-transmitting mechanism 1254.

The input shaft 17 is selectively connectible with the sun gear member 1222 through the torque-transmitting mechanism 1250 and selectively connectible with the planet carrier assembly member 1246 through the torque-transmitting mechanism 1252. The sun gear member 1232 is selectively connectible with the planet carrier assembly member 1246 through the torque-transmitting mechanism 1258 and selectively connectible with the ring gear member 1244 through the torque-transmitting mechanism 1260. The planet carrier assembly member 1236 is selectively connectible with the ring gear member 1244 through the torque-transmitting mechanism 1256.

The truth table shown in FIG. 26 provides a representation of the engagement combinations as well as the sequence of engagements for the torque-transmitting mechanisms in order to establish seven forward speed ratios and one reverse speed ratio through the planetary gear arrangement 1218 between the input shaft 17 and the output shaft 19. The truth table also provides a numerical example of the speed ratios that are available with the planetary gear arrangement 1218 when the ring gear/sun gear tooth ratios of the planetary gearsets 1220, 1230, and 1240 are as represented in the ratios R1/S1, R2/S2, and R3/S3, respectively. Further information given in FIG. 26 is by way of a chart in which the numerical values for the ratios steps between adjacent forward speed ratios and between the reverse and first forward speed ratio are given. This chart also provides a numerical example for the overall ratio spread of the forward speed ratios.

Upon reviewing the combination of engagements, those skilled in the art will recognize that the numerical value for the reverse speed ratio is determined by the ring gear/sun gear tooth ratio of the planetary gearset 1220. The numerical value for the first forward speed ratio is determined by the ring gear/sun gear tooth ratios of the planetary gearsets 1220 and 1230. The numerical value for the second forward speed ratio, the fourth forward speed ratio, and seventh forward speed ratio are determined by the ring gear/sun gear tooth ratios of all three planetary gearsets 1220, 1230, and 1240. The numerical value for the third forward speed ratio is one. The numerical value for the fifth forward speed ratio is determined by the ring gear/sun gear tooth ratio of the planetary gearset 1240. The numerical value for the sixth forward speed ratio is determined by the ring gear/sun gear tooth ratios of the planetary gearsets 1220 and 1240.

Figures 27, 28:
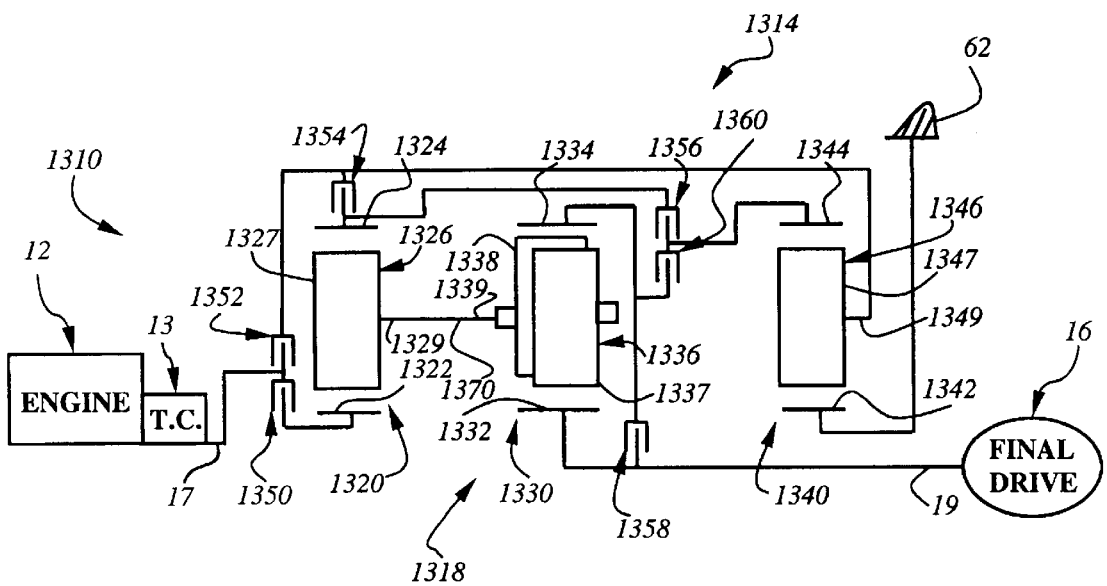
FIG. 27 is a schematic representation of a powertrain incorporating another family member of the present invention.
FIG. 28 is a truth table and chart describing some of the operating characteristics and numerical values that can be utilized with the family member shown in FIG. 27.

A powertrain 1310, shown in FIG. 27, includes the engine 12, the torque converter 13, a planetary transmission 1314, and the final drive mechanism 16. The planetary transmission 1314 includes the input shaft 17, a planetary gear arrangement 1318, and the output shaft 19. The planetary gear arrangement 1318 includes three planetary gearsets 1320, 1330, and 1340, and six torque-transmitting mechanisms 1350, 1352, 1354, 1356, 1358, and 1360. All of the torque-transmitting mechanisms are of the rotating type torque-transmitting mechanisms.

The planetary gearset 1320 includes a sun gear member 1322, a ring gear member 1324, and a planet carrier assembly member 1326. The planet carrier assembly member 1326 includes a plurality of pinion gears 1327 rotatably mounted on a planet carrier member 1329 and disposed in meshing relationship with both the sun gear member 1322 and the ring gear member 1324.

The planetary gearset 1330 includes a sun gear member 1332, a ring gear member 1334, and a planet carrier assembly member 1336. The planet carrier assembly member 1336 includes a plurality of pairs of intermeshing pinion gears 1337 and 1338 which are rotatably mounted on a planet carrier member 1339 and disposed in meshing relationship with both the sun gear member 1332 and the ring gear -member 1334, respectively.

The planetary gearset 1340 includes a sun gear member 1342, a ring gear member 1344, and a planet carrier assembly member 1346. The planet carrier assembly member 1346 includes a plurality of pinion gears 1347 rotatably mounted on a planet carrier member 1349 and disposed -in meshing relationship with both the sun gear member 1342 and the ring gear member 1344.

The planetary gearset 1330 is commonly termed a compound planetary gearset or a double pinion planetary gearset. With this type of planetary gearset, the pinion gear members are mounted in pairs on the planet carrier member and ,as with a single pinion planetary gearset, there may be three or four pairs of pinions depending on the torque requirements for the particular gearset. The distinction of the double pinion or compound planetary gearset is that when the carrier member is held stationary, the sun gear member and ring gear member will rotate in the same direction.

The planet carrier assembly member 1326 and planet carrier assembly member 1336 are continuously interconnected by an interconnecting member 1370. The sun gear member 1342 is continuously connected with the transmission housing 62. The output shaft 19 is continuously connected with the sun gear member 1332 and selectively connectible with the ring gear member 1334 through the torque-transmitting mechanism 1358.

The input shaft 17 is selectively connectible with the sun gear member 1322 through the torque-transmitting mechanism 1350 and selectively connectible with the planet carrier assembly member 1346 through the torque-transmitting mechanism 1352. The ring gear member 1324 is selectively connectible with the planet carrier assembly member 1346 through the torque-transmitting mechanism 1354 and selectively connectible with the ring gear member 1344 through the torque-transmitting mechanism 1356. The ring gear member 1344 and ring gear member 1334 are selectively interconnectible through the torque-transmitting mechanism 1360.

The truth table shown in FIG. 28 provides a pictorial representation of the engagement combinations and sequence for the torque-transmitting mechanisms in order to establish seven forward speed ratios and one reverse speed ratio between the input shaft 17 and the output shaft 19 through the planetary gear arrangement 1318. Also provided in the truth is an example of the numerical values for the ratios that are established within the planetary gear arrangement 1318. These numerical values are determined from the ring gear/sun gear tooth ratios of the planetary gearsets 1320, 1330, and 1340, which are represented as R1/S1, R2/S2, and R3/S3, respectively, in FIG. 28. The chart in FIG. 28 provides the numerical values for the ratio steps between adjacent forward speed ratios and between the reverse and first forward speed ratio when the numerical values given in the truth table are employed. Also provided in the chart of FIG. 28 is the overall ratio spread of the forward speed ratios.

Upon reviewing the combinations of engagements for the speed ratios shown in the truth table, those skilled in the art will recognize that the numerical value for the reverse speed ratio is determined by the ring gear/sun gear tooth ratios of the planetary gearsets 1320 and 1330. The numerical value for the first forward speed ratio is determined by the ring gear/sun gear tooth ratio of the planetary gearset 1320. The numerical values for the second forward speed ratio and the fourth forward speed ratio are determined by the ring gear/sun gear tooth ratios of the planetary gearsets 1320 and 1340. The numerical value of the third forward speed ratio is one. The numerical value of the fifth forward speed ratio is determined by the ring gear/sun gear tooth ratio of the planetary gearset 1340. The numerical value for the sixth forward speed ratio is determined by the ring gear/sun gear tooth ratios of all three planetary gearsets 1320, 1330, and 1340. The numerical value for the seventh forward speed ratio is determined by the ring gear/sun gear tooth ratios of the planetary gearsets 1330 and 1340.

Figures 29, 30:
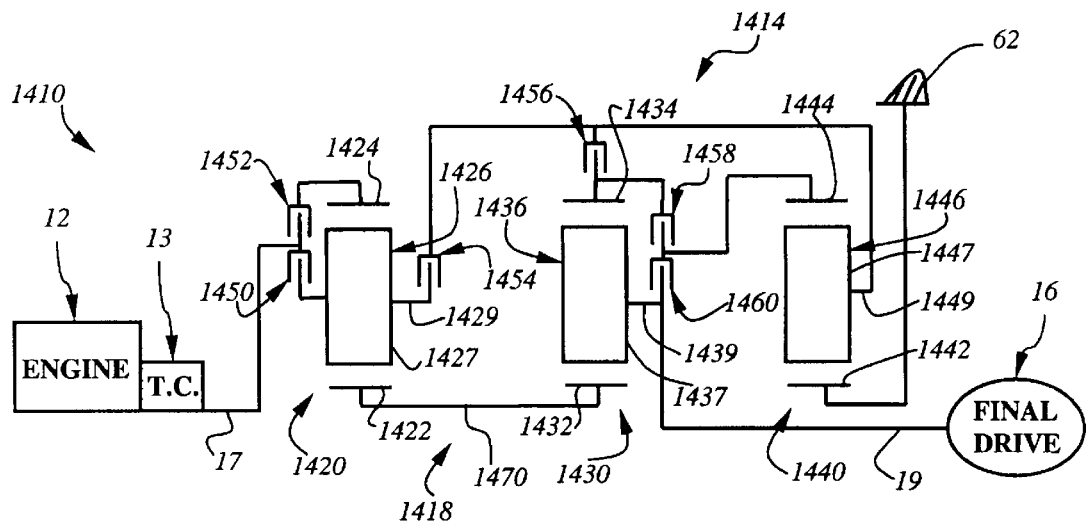
FIG. 29 is a schematic representation of a powertrain incorporating another family member of the present invention.
FIG. 30 is a truth table and chart describing some of the operating characteristics and numerical values that can be utilized with the family member shown in FIG. 29.

A powertrain 1410, shown in FIG. 29, includes the engine 12, the torque converter 13, a planetary transmission 1414, and the final drive mechanism 16. The planetary transmission 1414 includes the input shaft 17, a planetary gear arrangement 1418, and the output shaft 19. The planetary gear arrangement 1418 includes three planetary gearsets 1420, 1430, and 1440, and six torque-transmitting mechanisms 1450, 1452, 1454, 1456, 1458, and 1460. All of the torque-transmitting mechanisms are of the rotating type torque-transmitting mechanisms.

The planetary gearset 1420 includes a sun gear member 1422, a ring gear member 1424, and a planet carrier assembly member 1426. The planet carrier assembly member 1426 includes a plurality of pinion gears 1427 rotatably mounted on a planet carrier member 1429 and disposed in meshing relationship with both the sun gear member 1422 and the ring gear member 1424.

The planetary gearset 1430 includes a sun gear member 1432, a ring gear member 1434, and a planet carrier assembly member 1436. The planet carrier assembly member 1436 includes a plurality of pinion gears 1437 rotatably mounted on a planet carrier member 1439 and disposed in meshing relationship with both the sun gear member 1432 and the ring gear member 1434.

The planetary gearset 1440 includes a sun gear member 1442, a ring gear member 1444, and a planet carrier assembly member 1446. The planet carrier assembly member 1446 includes a plurality of pinion gears 1447 rotatably mounted on a planet carrier member 1449 and disposed in meshing relationship with both the sun gear member 1442 and the ring gear member 1444.

The sun gear member 1422 and sun gear member 1432 are continuously interconnected by an interconnecting member 1470. The sun gear member 1442 is continuously interconnected with the transmission housing 62. The output shaft 19 is continuously connected with the planet carrier assembly member 1436 and selectively connectible with the ring gear member 1444 through the torque-transmitting mechanism 1460.

The input shaft 17 is selectively connectible with the planet carrier assembly member 1426 through the torque-transmitting mechanism 1450 and selectively connectible with the ring gear member 1424 through the torque-transmitting mechanism 1452. The planet carrier assembly member 1446 is selectively connectible with the planet carrier assembly member 1426 through the torque-transmitting mechanism 1454 and selectively connectible with the ring gear member 1434 through the torque-transmitting mechanism 1456. The ring gear members 1444 and 1434 are selectively interconnectible by the torque-transmitting mechanism 1458.

The truth table shown in FIG. 30 provides a pictorial representation of the engagement combinations and sequence for the torque-transmitting mechanisms in order to establish seven forward speed ratios and one reverse speed ratio between the input shaft 17 and the output shaft 19 through the planetary gear arrangement 1418. The truth table of FIG. 30 also provides a numerical example for each of these speed ratios. The numerical examples given are determined utilizing the ring gear/sun gear tooth ratios R1/S1, R2/S2, and R3/S3, which represent the ring gear/sun gear tooth ratios for the planetary gearsets 1420, 1430, and 1440, respectively. Also provided in FIG. 30 is a chart giving the numerical values for the ratio steps between adjacent forward speed ratios as well as between the reverse and first forward speed ratio when the numerical values for the speed ratios are employed. Further information given in the chart of FIG. 30 is the overall ratio spread of the forward speed ratios.

Upon reviewing the engagement combinations given in the truth table, those skilled in the art will recognize that the numerical value for the reverse speed ratio is determined by the ring gear/sun gear tooth ratios of the planetary gearsets 1420 and 1430. The first forward speed ratio has a numerical value determined by the ring gear/sun gear tooth ratio of the planetary gearset 1430. The second forward speed ratio and fourth forward speed ratio have numerical values determined by the ring gear/sun gear tooth ratios of the planetary gearsets 1430 and 1440. The numerical value for the third forward speed ratio is one. The numerical value for the fifth forward speed ratio is determined by the ring gear/sun gear tooth ratio of the planetary gearset 1440. The sixth forward speed ratio has a numerical value determined by the ring gear/sun gear tooth ratios of the planetary gearsets 1420 and 1440. The seventh forward speed ratio has a numerical value determined by the ring gear/sun gear tooth ratios of all three planetary gearsets 1420, 1430, and 1440.

Figures 31, 32:
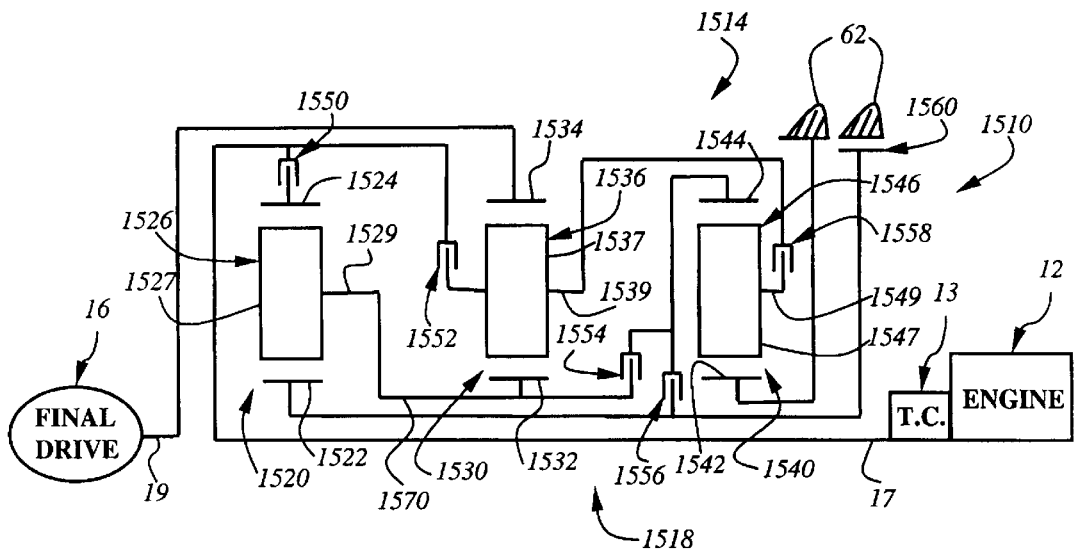
FIG. 31 is a schematic representation of a powertrain incorporating another family member of the present invention.
FIG. 32 is a truth table and chart describing some of the operating characteristics and numerical values that can be utilized with the family member shown in FIG. 31.

A powertrain 1510, shown in FIG. 31, includes the engine 12, the torque converter 13, a planetary transmission 1514, and the final drive mechanism 16. The planetary transmission 1514 includes the input shaft 17, a planetary gear arrangement 1518, and the output shaft 19. The planetary gear arrangement 1518 includes three planetary gearsets 1520, 1530, and 1540, and six torque-transmitting mechanisms 1550, 1552, 1554, 1556, 1558, and 1560. The torque-transmitting mechanism 1560 is a stationary type torque-transmitting mechanism while the remaining torque-transmitting mechanisms are of the rotating type torque-transmitting mechanisms.

The planetary gearset 1520 includes a sun gear member 1522, a ring gear member 1524, and a planet carrier assembly member 1526. The planet carrier assembly member 1526 includes a plurality of pinion gears 1527 rotatably mounted on a planet carrier member 1529 and disposed in meshing relationship with both the sun gear member 1522 and the ring gear member 1524.

The planetary gearset 1530 includes a sun gear member 1532, a ring gear member 1534, and a planet carrier assembly member 1536. The planet carrier assembly member 1536 includes a plurality of pinion gears 1537 rotatably mounted on a planet carrier member 1539 and disposed in meshing relationship with both the sun gear member 1532 and the ring gear member 1534.

The planetary gearset 1540 includes a sun gear member 1542, a ring gear member 1544, and a planet carrier assembly member 1546. The planet carrier assembly member 1546 includes a plurality of pinion gears 1547 rotatably mounted on a planet carrier member 1549 and disposed in meshing relationship with both the sun gear member 1542 and the ring gear member 1544.

The planet carrier assembly member 1526 and sun gear member 1532 are continuously interconnected by an interconnecting member 1570 which is selectively connectible with the ring gear member 1544 through the torque-transmitting mechanism 1554. The sun gear member 1542 is continuously connected with the transmission housing 62. The output shaft 19 is continuously connected with the ring gear member 1534.

The input shaft 17 is selectively connectible with the ring gear member 1524 through the torque-transmitting mechanism 1550 and selectively connectible with the planet carrier assembly member 1536 through the torque-transmitting mechanism 1552. The sun gear member 1522 is selectively interconnectible with the ring gear member 1544 through the torque-transmitting mechanism 1556 and selectively connectible with the transmission housing 62 through the torque-transmitting mechanism 1560. The planet carrier assembly members 1536 and 1546 are selectively interconnectible through the torque-transmitting mechanism 1558.

The truth table shown in FIG. 32 describes the engagement combinations and sequence for the establishment of seven forward speed ratios and one reverse speed ratio in the planetary gear arrangement 1518 between the input shaft 17 and the output shaft 19. Also given in the truth table is an example of the numerical values of the speed ratios, which can be provided by the planetary gear arrangement 1518 when the ring gear/sun gear tooth ratios of the planetary gearsets 1520, 1530, and 1540 are as given in FIG. 32 as R1/S1, R2/S2, and R3/S3, respectively. Also given in FIG. 32 is a chart providing the numerical values for the ratio steps between adjacent forward speed ratios as well as between the reverse and first forward speed ratio. Further information given in the chart of FIG. 32 is the overall ratio spread for the forward speed ratios.

Upon reviewing the engagement combinations for the torque-transmitting mechanisms, those skilled in the art will recognize that the numerical values for the reverse speed ratio and the sixth forward speed ratio are determined by the ring gear/sun gear tooth ratios of the planetary gearsets 1520 and 1530. The numerical values for the first forward speed ratio and the fourth forward speed ratio are determined by the ring gear/sun gear tooth ratios of all three planetary gearsets 1520, 1530, and 1540. The numerical values for the second forward speed ratio and the third forward speed ratio are determined by the ring gear/sun gear tooth ratios of the planetary gearsets 1530 and 1540. The numerical value of the fifth forward speed ratio is one. The numerical value of the seventh forward speed ratio is determined by the ring gear/sun gear tooth ratio of the planetary gearset 1530.

Figures 33, 34:
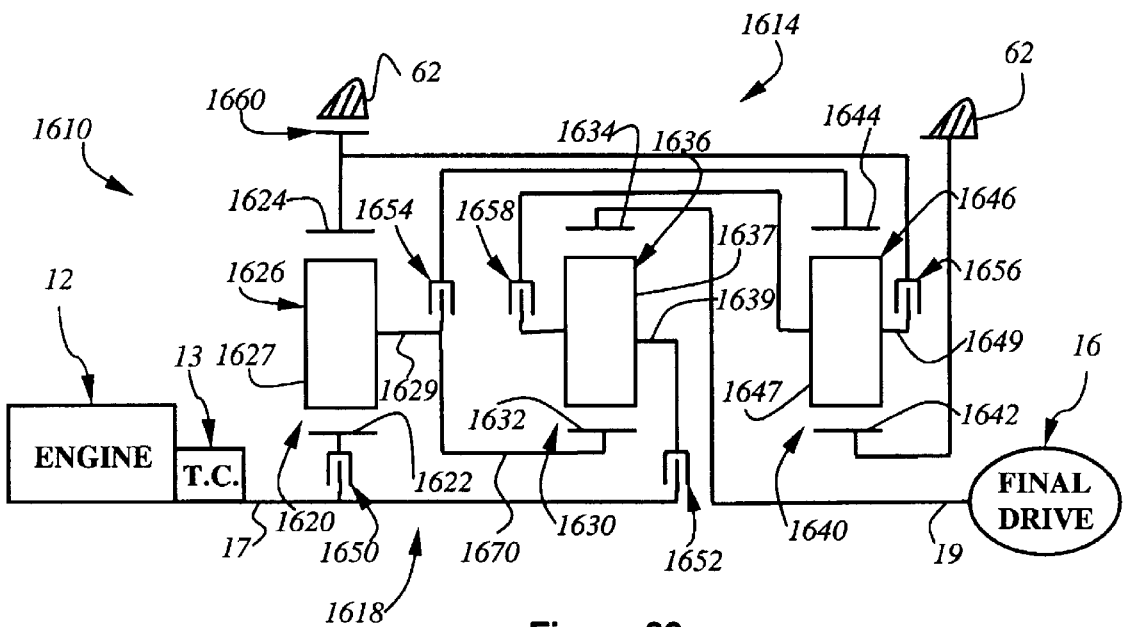
FIG. 33 is a schematic representation of a powertrain incorporating another family member of the present invention.
FIG. 34 is a truth table and chart describing some of the operating characteristics and numerical values that can be utilized with the family member shown in FIG. 33.

A powertrain 1610, shown in FIG. 33, includes the engine 12, the torque converter 13, a planetary transmission 1614, and the final drive mechanism 16. The planetary transmission 1614 includes the input shaft 17, a planetary gear arrangement 1618, and the output shaft 19. The planetary gear arrangement 1618 includes three planetary gearsets 1620, 1630, and 1640, and six torque-transmitting mechanisms 1650, 1652, 1654, 1656, 1658, and 1660. The torque-transmitting mechanism 1660 is a stationary type torque-transmitting mechanism while the remaining torque-transmitting mechanisms are of the rotating type torque-transmitting mechanisms.

The planetary gearset 1620 includes a sun gear member 1622, a ring gear member 1624, and a planet carrier assembly member 1626. The planet carrier assembly member 1626 includes a plurality of pinion gears 1627 rotatably mounted on a planet carrier member 1629 and disposed in meshing relationship with both the sun gear member 1622 and the ring gear member 1624.

The planetary gearset 1630 includes a sun gear member 1632, a ring gear member 1634, and a planet carrier assembly member 1636. The planet carrier assembly member 1636 includes a plurality of pinion gears 1637 rotatably mounted on a planet carrier member 1639 and disposed in meshing relationship with both the sun gear member 1632 and the ring gear member 1634.

The planetary gearset 1640 includes a sun gear member 1642, a ring gear member 1644, and a planet carrier assembly member 1646. The planet carrier assembly member 1646 includes a plurality of pinion gears 1647 rotatably mounted on a planet carrier member 1649 and disposed in meshing relationship with both the sun gear member 1642 and the ring gear member 1644.

The planet carrier assembly member 1626 and sun gear member 1632 are continuously interconnected by an interconnecting member 1670, which is selectively connectible with the ring gear member 1644 through the torque-transmitting mechanism 1654. The sun gear member 1642 is continuously connected with the transmission housing 62.

The ring gear member 1634 is continuously connected with the output shaft 19.

The input shaft 17 is selectively connectible with sun gear member 1622 through torque-transmitting mechanism 1650 and selectively connectible with the planet carrier assembly member 1636 through the torque-transmitting mechanism 1652. The ring gear member 1624 is selectively connectible with the planet carrier assembly member 1646 through the torque-transmitting mechanism 1656 and selectively connectible with the transmission housing 62 through the torque-transmitting mechanism 1660. The planet carrier assembly member 1646 and the planet carrier assembly member 1636 are selectively interconnectible through the torque-transmitting mechanism 1658.

The truth table shown in FIG. 34 describes the engagement combinations and sequence for the establishment of seven forward speed ratios and one reverse speed ratio in the planetary gear arrangement 1618 between the input shaft 17 and the output shaft 19. Also given in the truth table is an example of the numerical values of the speed ratios, which can be provided by the planetary gear arrangement 1618 when the ring gear/sun gear tooth ratios of the planetary gearsets 1620, 1630, and 1640 are as given in FIG. 34 as R1/S1, R2/S2, and R3/S3, respectively. Also given in FIG. 34 is a chart providing the numerical values for the ratio steps between adjacent forward speed ratios as well as between the reverse and first forward speed ratio. Further information given in the chart of FIG. 34 is the overall ratio spread for the forward speed ratios.

Upon reviewing the combinations of engagements for the torque-transmitting mechanisms, those skilled in the art will recognize that the numerical values for the reverse speed ratio and sixth forward speed ratio are determined by the ring gear/sun gear tooth ratios of the planetary gearsets 1620 and 1630. The numerical values for the first forward speed ratio, the second forward speed ratio, and the fifth forward speed ratio are determined by the ring gear/sun gear tooth ratios of all three planetary gearsets 1620, 1630, and 1640. The numerical value for the third forward speed ratio is determined by the ring gear/sun gear tooth ratios of the planetary gearsets 1630 and 1640. The fourth forward speed ratio has a numerical value of one. The numerical value of the seventh forward speed ratio is determined by the ring gear/sun gear tooth ratio of the planetary gearset 1630.

Figures 35, 36:
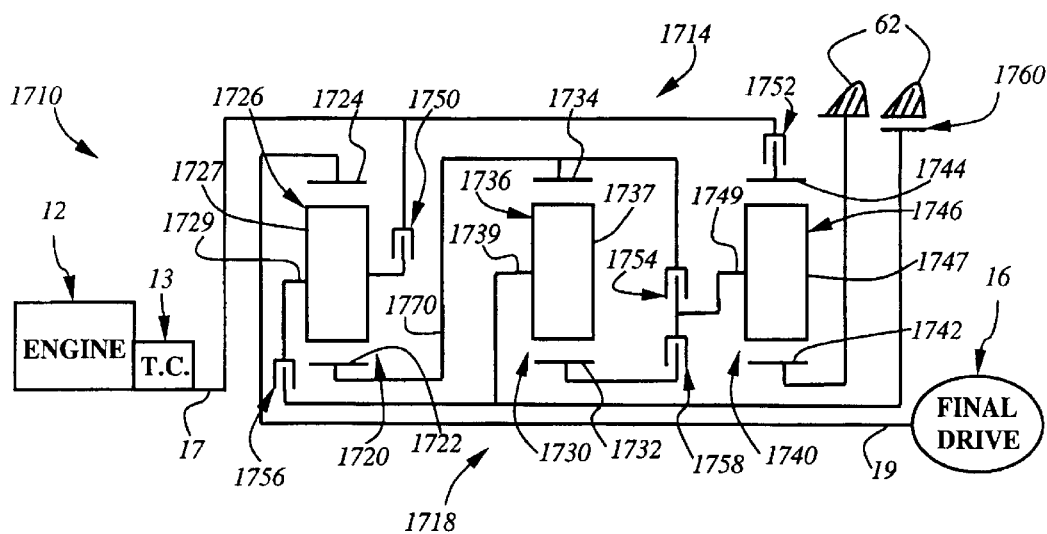
FIG. 35 is a schematic representation of a powertrain incorporating another family member of the present invention.
FIG. 36 is a truth table and chart describing some of the operating characteristics and numerical values that can be utilized with the family member shown in FIG. 35.

A powertrain 1710, shown in FIG. 35, includes the engine 12, the torque converter 13, a planetary transmission 1714, and the final drive mechanism 16. The planetary transmission 1714 includes the input shaft 17, a planetary gear arrangement 1718, and the output shaft 19. The planetary gear arrangement 1718 includes three planetary gearsets 1720, 1730, and 1740, and six torque-transmitting mechanisms 1750, 1752, 1754, 1756, 1758, and 1760. The torque-transmitting mechanism 1760 is a stationary type torque-transmitting mechanism while the remaining torque-transmitting mechanisms are of the rotating type torque-transmitting mechanisms.

The planetary gearset 1720 includes a sun gear member 1722, a ring gear member 1724, and a planet carrier assembly member 1726. The planet carrier assembly member 1726 includes a plurality of pinion gears 1727 rotatably mounted on a planet carrier member 1729 and disposed in meshing relationship with both the sun gear member 1722 and the ring gear member 1724.

The planetary gearset 1730 includes a sun gear member 1732, a ring gear member 1734, and a planet carrier assembly member 1736. The planet carrier assembly member 1736 includes a plurality of pinion gears 1737 rotatably mounted on a planet carrier member 1739 and disposed in meshing relationship with both the sun gear member 1732 and the ring gear member 1734.

The planetary gearset 1740 includes a sun gear member 1742, a ring gear member 1744, and a planet carrier assembly member 1746. The planet carrier assembly member 1746 includes a plurality of pinion gears 1747 rotatably mounted on a planet carrier member 1749 and disposed in meshing relationship with both the sun gear member 1742 and the ring gear member 1744.

The sun gear member 1722 and the ring gear member 1734 are continuously interconnected by an interconnecting member 1770, which is selectively connectible with the planet carrier assembly member 1746 through the torque-transmitting mechanism 1754. The sun gear member 1742 is continuously connected with the transmission housing 62. The output shaft 19 is continuously connected with the ring gear member 1724.

The input shaft 17 is selectively connectible with the planet carrier assembly member 1726 through the torque-transmitting mechanism 1750 and selectively connectible with the ring gear member 1744 through the torque-transmitting mechanism 1752. The planet carrier assembly member 1736 is selectively interconnectible with the planet carrier assembly member 1726 through the torque-transmitting mechanism 1756 and selectively connectible with the transmission housing 62 through the torque-transmitting mechanism 1760. The planet carrier assembly member 1746 is selectively connectible with the sun gear member 1732 through the torque-transmitting mechanism 1758.

The truth table shown in FIG. 36 provides a pictorial representation of the engagement combinations and sequence for the torque-transmitting mechanisms in order to establish seven forward speed ratios and one reverse speed ratio in the planetary gear arrangement 1718 between the input shaft 17 and the output shaft 19. The truth table also provides an example of the numerical values for these speed ratios. These numerical values are determined from the ring gear/sun gear tooth ratios of the planetary gearsets 1720, 1730, and 1740, which are represented by R1/S1, R2/S2, and R3/S3, respectively. Further information provided in FIG. 36 is shown in the chart, which depicts the numerical values for the ratio steps between adjacent forward speed ratios as well as between the reverse and first forward speed ratio. The chart also provides the numerical value for the overall ratio spread of the forward speed ratios.

Upon reviewing the combination of engagements shown in the truth table, those skilled in the art will recognize that the numerical values for the reverse speed ratio and the fifth forward speed ratio are determined by the ring gear/sun gear tooth ratios of the planetary gearsets 1720 and 1740. The numerical values for the first forward speed ratio, the third forward speed ratio, and the seventh forward speed ratio are determined by the ring gear/sun gear tooth ratios of all three planetary gearsets 1720, 1730, and 1740. The numerical value for the second forward speed ratio is determined by the ring gear/sun gear tooth ratio of the planetary gearset 1740. The fourth forward speed ratio has a numerical value of one. The sixth forward speed ratio has a numerical value determined by the ring gear/sun gear tooth ratio of the planetary gearset 1720.

It should now be apparent that each family member includes three planetary gearsets and six torque-transmitting mechanisms. In each family member, a member of a first planetary gearset is continuously connected to a member of a second planetary gearset. A member of the third planetary gearset is continuously connected with a transmission housing. At least one member of one of the planetary gearsets is continuously connected with an output shaft.

An input shaft is selectively connectible with members of the planetary gearsets through two selectively engageable torque-transmitting mechanisms. Four other torque-transmitting mechanisms provide selective engagement between either members of the planetary gearsets or members of the planetary gearsets and a transmission housing. By selectively engaging these six torque-transmitting mechanisms in combinations of four, the transmission family members will each provide at least seven forward speed ratios and a reverse speed ratio.

From reviewing the truth table given for these family members, it is evident that each of the single steps between adjacent forward speed ratios is of the single transition variety.

It should be apparent that modifications and variations are possible to the family members that are not depicted in the above-described embodiments. Therefore, the invention only to be limited by the appended claims.

We claim:

1. A multi-speed power transmission comprising:
   an input shaft;
   an output shaft;
   a transmission housing;
   a first planetary gearset having first, second, and third members;
   a second planetary gearset having first, second, and third members;
   a third planetary gearset having first, second, and third members;
   an interconnecting member continuously interconnecting said first member of said first planetary gearset and said first member of said second planetary gearset;
   said first member of said third planetary gearset being continuously connected with said transmission housing, said output shaft being continuously interconnected with at least one member of one of said planetary gearsets;
   a first torque-transmitting mechanism selectively interconnecting said input shaft with a member of one of said planetary gearsets;
   a second torque-transmitting mechanism selectively interconnecting said input shaft with another member of one of said planetary gearsets;
   a third torque-transmitting mechanism selectively interconnecting a member of one of said planetary gearsets with at least one member of another of said planetary gearsets;
   a fourth torque-transmitting mechanism selectively interconnecting a member of said first or second planetary gearset with another member of one of said planetary gearsets;
   a fifth torque-transmitting mechanism selectively interconnecting a member of said second or third planetary gearset with member of another of said planetary gearsets;
   a sixth torque-transmitting mechanism selectively connecting a member of one of said planetary gearsets with either another member of one of said planetary gearsets or with said transmission housing; and said six torque-transmitting mechanisms being selectively engaged in combinations of four to establish at least seven forward speed ratios and one reverse speed ratio in said family member between said input shaft and said output shaft.

2. A multi-speed power transmission comprising:

an input shaft;

an output shaft;

a transmission housing;

a first planetary gearset having first, second, and third members;

a second planetary gearset having first, second, and third members;

a third planetary gearset having first, second, and third members;

an interconnecting member continuously interconnecting said first member of said first planetary gearset and said first member of said second planetary gearset;

said first member of said third planetary gearset being continuously connected with said transmission housing;

said output shaft being continuously interconnected with at least one member of one of said planetary gearsets;

six torque transmitting mechanisms being selectively engageable in combinations of four to establish at least seven forward speed ratios and one reverse speed ratio between said input shaft and said output shaft with either:

the first of said torque transmitting mechanisms selectively interconnecting said input shaft with said third member of said first planetary gearset, the second of said torque transmitting mechanisms selectively interconnecting said input shaft with said second member of said third planetary gearset, the third torque transmitting mechanisms selectively interconnecting said third member of said third planetary gearset with said interconnecting member, the fourth torque transmitting mechanisms selectively interconnecting said third member of said first planetary gearset with said second member of said second planetary gearset, the fifth of said torque transmitting mechanisms selectively interconnecting said third member of said second planetary gearset with said third member of said third planetary gearset, and the sixth of said torque transmitting mechanisms selectively interconnecting said transmission housing with said third member of said second planetary gearset, or said first torque-transmitting mechanism selectively interconnecting said input shaft with said third member of said first planetary gearset, said second torque-transmitting mechanism selectively interconnecting said input shaft with said second member of said second planetary gearset, said third torque-transmitting mechanism selectively interconnecting said second member of said third planetary gearset with said interconnecting member, said fourth torque-transmitting mechanism selectively interconnecting said third member of said first planetary gearset with said second member of said second planetary gearset, said fifth torque-transmitting mechanism selectively interconnecting said third member of said second planetary gearset with said second member of said third planetary gearset, and said sixth torque-transmitting mechanism selectively interconnecting said third member of said second planetary gearset with said third member of said third planetary gearset, or said first torque-transmitting mechanism selectively interconnecting said input shaft with said second member of said first planetary gearset, said second torque-transmitting mechanism selectively interconnecting said input shaft with said third member of said second planetary gearset, said third torque-transmitting mechanism selectively interconnecting said second member of said third planetary gearset with said interconnecting member, said fourth torque-transmitting mechanism selectively interconnecting said third member of said first planetary gearset with said third member of said third planetary gearset, said fifth torque-transmitting mechanism selectively interconnecting said third member of said second planetary gearset with said third member of said third planetary gearset, and said sixth torque-transmitting mechanism selectively interconnecting said transmission housing with said third member of said first planetary gearset, or said first torque-transmitting mechanism selectively interconnecting said input shaft with said second member of said first planetary gearset, said second torque-transmitting mechanism selectively interconnecting said input shaft with said third member of said second planetary gearset, said third torque-transmitting mechanism selectively interconnecting said second member of said third planetary gearset with said interconnecting member, said fourth torque-transmitting mechanism selectively interconnecting said third member of said first planetary gearset with said second member of said third planetary gearset, said fifth torque-transmitting mechanism selectively interconnecting said third member of said second planetary gearset with said third member of said third planetary gearset, and said sixth torque-transmitting mechanism selectively interconnecting said transmission housing with said third member of said first planetary gearset, or said first torque-transmitting mechanism selectively interconnecting said input shaft with said second member of said first planetary gearset, said second torque-transmitting mechanism selectively interconnecting said input shaft with said third member of said second planetary gearset, said third torque-transmitting mechanism selectively interconnecting said second member of said first planetary gearset with said third member of said first planetary gearset, said fourth torque-transmitting mechanism selectively interconnecting said third member of said first planetary gearset with said second member of said third planetary gearset, said fifth torque-transmitting mechanism selectively interconnecting said third member of said second planetary gearset with said third member of said third planetary gearset, and said sixth torque-transmitting mechanism selectively interconnecting said transmission housing with said second member of said third planetary gearset, or said first torque-transmitting mechanism selectively interconnecting said input shaft with said third member of said first planetary gearset, said second torque-transmitting mechanism selectively interconnecting said input shaft with said second member of said third planetary gearset, said third torque-transmitting mechanism selectively interconnecting said third member of said third planetary gearset with said interconnecting member, said fourth torque-transmitting mechanism selectively interconnecting said third member of said first planetary gearset with said second member of said second planetary gearset, said fifth torque-transmitting mechanism selectively interconnecting said third member of said second planetary gearset with said third member of said third planetary gearset, and said sixth torque-transmitting mechanism selectively interconnecting said transmission housing with said second member of said second planetary gearset, or said first torque-transmitting mechanism selectively interconnecting said input shaft with said third member of said first planetary gearset, said second torque-transmitting mechanism selectively interconnecting said input shaft with said second member of said third planetary gearset, said third torque-transmitting mechanism selectively interconnecting said second member of said third planetary gearset with said interconnecting member, said fourth torque-transmitting mechanism selectively interconnecting said second member of said second planetary gearset with said second member of said first planetary gearset, said fifth torque-transmitting mechanism selectively interconnecting said second member of said second planetary gearset with said third member of said third planetary gearset, and said sixth torque-transmitting mechanism selectively interconnecting said third member of said second planetary gearset with said third member of said third planetary gearset, or said first torque-transmitting mechanism selectively interconnecting said input shaft with said third member of said first planetary gearset, said second torque-transmitting mechanism selectively interconnecting said input shaft with said second member of said third planetary gearset, said third torque-transmitting mechanism selectively interconnecting said third member of said second planetary gearset with said interconnecting member, said fourth torque-transmitting mechanism selectively interconnecting said third member of said first planetary gearset with said second member of said third planetary gearset, said fifth torque-transmitting mechanism selectively interconnecting said third member of said second planetary gearset with said third member of said third planetary gearset, and said sixth torque-transmitting mechanism selectively interconnecting said second member of said second planetary gearset with said third member of said third planetary gearset, or said first torque-transmitting mechanism selectively interconnecting said input shaft with said second member of said first planetary gearset, said second torque-transmitting mechanism selectively interconnecting said input shaft with said third member of said second planetary gearset, said third toque-transmitting mechanism selectively interconnecting said second member of said first planetary gearset with said third member of said first planetary gearset, said fifth torque-transmitting mechanism selectively interconnecting said third member of said first planetary gearset with said second member of said third planetary gearset, said fifth torque-transmitting mechanism selectively interconnecting said third member of said second planetary gearset with said third member of said third planetary gearset, and said sixth torque-transmitting mechanism selectively interconnecting said second member of said third planetary gearset with said third member of said third planetary gearset, or said first torque-transmitting mechanism selectively interconnecting said input shaft with said second member of said first planetary gearset, said second torque-transmitting mechanism selectively interconnecting said input shaft with said third member of said second planetary gearset, said third torque-transmitting mechanism selectively interconnecting said second member of said third planetary gearset with said interconnecting member, said fourth torque-transmitting mechanism selectively interconnecting said second member of said first planetary gearset with said second member of said third planetary gearset, said fifth torque-transmitting mechanism selectively interconnecting said third member of said first planetary gearset with said third member of said third planetary gearset, and said sixth torque-transmitting mechanism selectively interconnecting said third member of said third planetary gearset with said second member of said second planetary gearset, or said first torque-transmitting mechanism selectively interconnecting said input shaft with said second member of said first plane gearset, said second torque-transmitting mechanism selectively interconnecting said input shaft with said second member of said third planetary gearset, said third torque-transmitting mechanism selectively interconnecting said interconnecting member with said output shaft, said fourth torque-transmitting mechanism selectively interconnecting said third member of said first planetary gearset with said third member of said third planetary gearset, said fifth torque-transmitting mechanism selectively interconnecting said third member of said first planetary gearset with said second member of said third planetary gearset, and said sixth toque-transmitting mechanism selectively interconnecting said third member of said second planetary gearset with said third member of said third planetary gearset, or said first torque-transmitting mechanism selectively interconnecting said input shaft with said third member of said first planetary gearset, said second torque-transmitting mechanism selectively interconnecting said input shaft with said second member of said second planetary gearset, said third torque-transmitting mechanism selectively interconnecting said second member of said third planetary gearset with said interconnecting member, said fourth torque-transmitting mechanism selectively interconnecting said third member of said first planetary gearset with said third member of said second planetary gearset, said fifth torque-transmitting mechanism selectively interconnecting said second member of said second planetary gearset with said second member of said third planetary gearset, and said sixth torque-transmitting mechanism selectively interconnecting said second member of said second planetary gearset with said third member of said third planetary gearset, or said first torque-transmitting mechanism selectively interconnecting said input shaft with said third member of said first planetary gearset, said second torque-transmitting mechanism selectively interconnecting said input shaft with said second member of said third planetary gearset, said third torque-transmitting mechanism selectively interconnecting said second member of said second planetary gearset with said output shaft, said fourth torque-transmitting mechanism selectively interconnecting said second member of said second planetary gearset with said third member of said third planetary gearset, said fifth torque-transmitting mechanism selectively interconnecting said third member of said second planetary gearset with said second member of said third planetary gearset, and said sixth torque-transmitting mechanism selectively interconnecting said third member of said second planetary gearset with said third member of said third planetary gearset, or said first torque-transmitting mechanism selectively interconnecting said input shaft with said second member of said first planetary gearset, said second torque-transmitting mechanism selectively interconnecting said input shaft with said second member of said third planetary gearset, said third torque-transmitting mechanism selectively interconnecting said third member of said first planetary gearset with said second member of said third planetary gearset, said fourth torque-transmitting mechanism selectively interconnecting said third member of said first planetary gearset with said third member of said third planetary gearset, said fifth torque-transmitting mechanism selectively interconnecting said third member of said second planetary gearset with said output shaft, and said sixth torque-transmitting mechanism selectively interconnecting said third member of said second planetary gearset with said third member of said third planetary gearset, or said first torque-transmitting mechanism selectively interconnecting said input shaft with said second member of said first planetary gearset, said second torque-transmitting mechanism selectively interconnecting said input shaft with said third member of said first planetary gearset, said third torque-transmitting mechanism selectively interconnecting said second member of said first planetary gearset with said second member of said third planetary gearset, said fourth torque-transmitting mechanism selectively interconnecting said third member of said second planetary gearset with said second member of said third planetary gearset, said fifth torque-transmitting mechanism selectively interconnecting said third member of said second planetary gearset with said third member of said third planetary gearset, and said sixth torque-transmitting mechanism selectively interconnecting said third member of said third planetary gearset with said output shaft, or said first torque-transmitting mechanism selectively interconnecting said input shaft with said second member of said first planetary gearset, said second torque-transmitting mechanism selectively interconnecting said input shaft with said third member of said second planetary gearset, said third torque-transmitting mechanism selectively interconnecting said second member of said third planetary gearset with said interconnecting member, said fourth torque-transmitting mechanism selectively interconnecting said third member of said first planetary gearset with said second member of said third planetary gearset, said fifth torque-transmitting mechanism selectively interconnecting said third member of said second planetary gearset wit said third member of said third planetary gearset, and said sixth torque-transmitting mechanism selectively interconnecting said transmission housing with said third member of said first planetary gearset, or said first torque-transmitting mechanism selectively interconnecting said input shaft with said second member of said first planetary gearset, said second torque-transmitting mechanism selectively interconnecting said input shaft with said third member of said second planetary gearset, said third torque-transmitting mechanism selectively interconnecting said second member of said third planetary gearset with said interconnecting member, said fourth torque-transmitting mechanism selectively interconnecting said third member of said first planetary gearset with said third member of said third planetary gearset, said fifth torque-transmitting mechanism selectively interconnecting aid third member of said second planetary gearset with said third member of said second planetary gearset, and said sixth torque-transmitting mechanism selectively interconnecting said transmission housing with said third member of said first planetary gearset, or said first torque-transmitting mechanism selectively interconnecting said input shaft with said third member of said first planetary gearset, said second torque-transmitting mechanism selectively interconnecting said input shaft with said second member of said third planetary gearset, said third torque-transmitting mechanism selectively interconnecting said third member of said third planetary gearset with said interconnecting member, said fourth torque-transmitting mechanism selectively interconnecting said third member of said first planetary gearset with said second member of said second planetary gearset, said fifth torque-transmitting mechanism selectively interconnecting said third member of said second planetary gearset with said third member of said third planetary gearset, and said sixth torque-transmitting mechanism selectively interconnecting said transmission housing with said third member of said second planetary gearset.

3. The multi-speed power transmission defined in claim 2 further comprising:
each of said planetary gearset consisting of a member of a group consisting of simple planetary gear sets and compound planetary gear sets.

4. The multi-speed power transmissions defined in claim 3 further comprising:
each of said first members of each of said planetary gearsets is a member of a group consisting of a sun gear member, a ring gear member, and a planet carrier assembly member; each of said second members of each of said planetary gearsets is a member of said group consisting of said sun gear member, said ring gear member, and said planet carrier member that is not selected as said first member; and each of said third members of each of said planetary gearsets is a member of said group consisting of said sun gear member, said ring gear member, and said planet carrier member that is not selected as said first member and said second member.

5. A multi-speed power transmission comprising:
an input shaft;

an output shaft;

a transmission housing;

a first planetary gearset having first, second, and third members;

a second planetary gearset having first, second, and third members;

a third planetary gearset having first, second, and third members;

an interconnecting member continuously interconnecting said first member of said first planetary gearset and said first member of said second planetary gearset;

said first member of said third planetary gearset being continuously connected with said transmission housing;

said output shaft being continuously interconnected with at least one member of one of said planetary gearsets;

said input shaft being interconnected with members of said planetary gearset only through first and second individually-operated selectively-engageable torque transmitting mechanisms;

six torque transmitting mechanisms including said first and second torque transmitting mechanisms selectively interconnecting members of said planetary gearsets with said input shaft, said output shaft or other members of said planetary gearsets;

said six torque transmitting mechanisms being selectively engageable in combinations of four to establish at least seven forward speed ratios and one reverse speed ratio between said input shaft and said output shaft.

* * * * *